(12) United States Patent
Yamada et al.

(10) Patent No.: US 6,850,079 B2
(45) Date of Patent: Feb. 1, 2005

(54) FILM THICKNESS MEASURING APPARATUS AND A METHOD FOR MEASURING A THICKNESS OF A FILM

(75) Inventors: Keizo Yamada, Kanagawa (JP); Yousuke Itagaki, Kanagawa (JP); Takeo Ushiki, Kanagawa (JP)

(73) Assignee: Fab Solutions, Inc., Kanagawa (JP)

( * ) Notice: Subject to any disclaimer, the term of this patent is extended or adjusted under 35 U.S.C. 154(b) by 100 days.

(21) Appl. No.: 10/342,242

(22) Filed: Jan. 15, 2003

(65) Prior Publication Data

US 2003/0132765 A1 Jul. 17, 2003

(30) Foreign Application Priority Data

Jan. 17, 2002 (JP) ........................................ 2002-009305

(51) Int. Cl.[7] ........................ G01R 27/08; G01R 31/305
(52) U.S. Cl. ........................ 324/702; 324/716; 324/751
(58) Field of Search ................................. 324/702, 716, 324/96, 71.3, 751–753, 765, 662, 671, 699; 250/310

(56) References Cited

U.S. PATENT DOCUMENTS

| | | | |
|---|---|---|---|
| 3,614,608 | A | 10/1971 | Giedd |
| 4,296,372 | A | 10/1981 | Feuerbaum |

(List continued on next page.)

FOREIGN PATENT DOCUMENTS

| | | |
|---|---|---|
| JP | 50-63990 | 5/1975 |
| JP | 57-6310 | 1/1982 |
| JP | 62-019707 | 1/1987 |
| JP | 63-9807 | 1/1988 |
| JP | 03-205573 | 9/1991 |
| JP | 04-062857 | 2/1992 |
| JP | 05-045147 | 2/1993 |
| JP | 06-273297 | 9/1994 |
| JP | 6-273297 A | 9/1994 |
| JP | 07-066172 | 3/1995 |
| JP | 8-5528 A | 1/1996 |
| JP | 08-005528 | 1/1996 |
| JP | 08-313244 | 11/1996 |
| JP | 09-061142 | 3/1997 |
| JP | 10-281746 | 10/1998 |
| JP | 10-300450 | 11/1998 |
| JP | 11-026343 | 1/1999 |
| JP | 2000-124276 | 4/2000 |
| JP | 2000-164715 | 6/2000 |
| JP | 2000-174077 | 6/2000 |
| JP | 2000-180143 A | 6/2000 |
| JP | 2000-180143 | 6/2000 |

OTHER PUBLICATIONS

"An In-Line Contact and Via Hole Inspection Method Using Electron Beam Compensation Current", Yamada et al., IEEE 1999, Doc. No. 0–7803–5413–3/99/, available from http://www.fabsol.com/us/images/library/21.pdf.

Primary Examiner—Anjan K. Deb
(74) Attorney, Agent, or Firm—Neil A. Steinberg

(57) ABSTRACT

An apparatus for measuring the thickness of thin-film cause electron beams of first and second energies to strike thin-film to be measured that is formed on a silicon substrate, and measures the first substrate current value of current flowing in the substrate when it is struck by an electron beam of a first energy and the second substrate current value of current flowing in the substrate when it is struck by an electron beam of a second energy. The thin-film measuring apparatus obtains reference data indicating a relationship between the film thickness and a reference function having as variables the substrate current for the case of an electron beam of the first energy striking a standard sample and the substrate current for the case of an electron beam of the second energy striking the standard sample, and calculates the thickness of the thin-film under measurement based on the first and second substrate current values, giving consideration to the reference data.

32 Claims, 12 Drawing Sheets

U.S. PATENT DOCUMENTS

| | | | |
|---|---|---|---|
| 4,609,867 A | | 9/1986 | Schink |
| 4,859,939 A | * | 8/1989 | Gittleman et al. .......... 324/752 |
| 4,949,162 A | | 8/1990 | Tamaki et al. |
| 4,967,152 A | * | 10/1990 | Patterson .................... 324/752 |
| 4,988,877 A | | 1/1991 | Stokowksi et al. |
| 5,001,536 A | | 3/1991 | Fukuzawa et al. |
| 5,089,774 A | | 2/1992 | Nakano |
| 5,097,204 A | * | 3/1992 | Yoshizawa et al. ......... 324/751 |
| 5,132,507 A | | 7/1992 | Nakano |
| 5,138,256 A | * | 8/1992 | Murphy et al. ............. 324/767 |
| 5,280,176 A | | 1/1994 | Jach et al. |
| 5,327,012 A | | 7/1994 | Yano et al. |
| 5,365,034 A | | 11/1994 | Kawamura et al. |
| 5,412,210 A | | 5/1995 | Todokoro et al. |
| 5,427,052 A | | 6/1995 | Ohta et al. |
| 5,453,994 A | | 9/1995 | Kawamoto et al. |
| 5,493,236 A | | 2/1996 | Ishii et al. |
| 5,578,821 A | | 11/1996 | Meisberger et al. |
| 5,637,186 A | | 6/1997 | Liu et al. |
| 5,717,204 A | | 2/1998 | Meisberger et al. |
| 5,757,198 A | | 5/1998 | Shida et al. |
| 5,780,870 A | | 7/1998 | Maeda et al. |
| 5,815,002 A | | 9/1998 | Nikawa |
| 5,900,645 A | | 5/1999 | Yamada |
| 5,989,919 A | | 11/1999 | Aoki |
| 6,037,588 A | | 3/2000 | Liu et al. |
| 6,052,478 A | | 4/2000 | Wihl et al. |
| 6,078,386 A | | 6/2000 | Tsai et al. |
| 6,127,193 A | | 10/2000 | Bang et al. |
| 6,141,038 A | | 10/2000 | Young et al. |
| 6,163,159 A | | 12/2000 | Seyama |
| 6,169,603 B1 | | 1/2001 | Takayama |
| 6,306,001 B1 | | 10/2001 | Hiroki |
| 6,317,514 B1 | | 11/2001 | Reinhorn et al. |
| 6,344,750 B1 | | 2/2002 | Lo et al. |
| 6,459,282 B1 | | 10/2002 | Nakamura |
| 6,504,393 B1 | * | 1/2003 | Lo et al. ..................... 324/765 |
| 6,603,122 B2 | | 8/2003 | Taleyarkhan |
| 6,614,244 B2 | * | 9/2003 | Yamada et al. ............. 324/751 |
| 6,683,308 B2 | * | 1/2004 | Itagaki et al. ............... 250/310 |
| 6,768,324 B1 | | 7/2004 | Yamada et al. |
| 2003/0132765 A1 | | 7/2003 | Yamada et al. |

\* cited by examiner

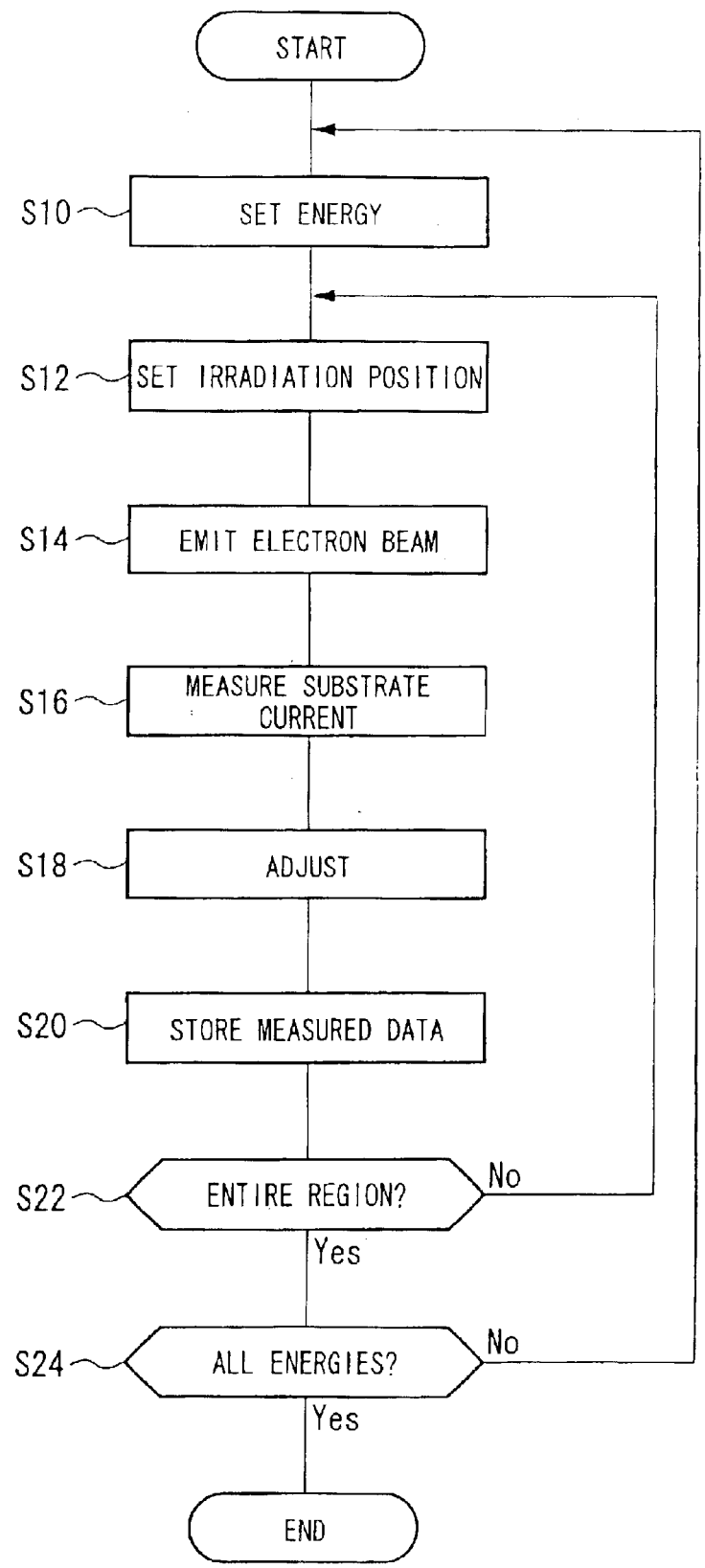

|  | d1 | d2 | d3 | ... |
|---|---|---|---|---|
| $Ir(E1)$ | a | b | c | ... |
| $Ir(E2)$ | d | e | f | ... |
| $Ir(E1)-Ir(E2)$ | a-d | e-b | c-f | ... |
| $Ir(E1)/Ir(E2)$ | a/d | b/e | c/f | ... |

~60

|  | (x1, y1) | (x1, y2) | (x1, y3) | ... |
|---|---|---|---|---|
| Im(E1) | g | h | i | ... |
| Im(E2) | j | k | l | ... |
| Im(E1)−Im(E2) | g−j | h−k | i−l | ... |

FILM THICKNESS MEASURING APPARATUS AND A METHOD FOR MEASURING A THICKNESS OF A FILM

BACKGROUND OF THE INVENTION

1. Field of the Invention

The present invention relates to an apparatus for measuring a thickness of a film to be measured and a method for measuring a thickness of a film to be measured using an electron beam.

2. Related Art

In the past, for example in the method disclosed in Japanese unexamined patent publication (KOKAI) No. H6-273297, when making a thickness of a sample to be thin so as to give the sample a thin film like configuration by irradiating an ion beam at the sample, an electron beam is irradiated at the sample simultaneously with the irradiation of the ion beam thereat, and the electron beam having passed through the sample being detected by a Faraday cup so as to prevent excessive etching against the sample.

In Japanese unexamined patent publication (KOKAI) No. H8-5528, there is a disclosure of a technology in that an ion beam machining device is used for making a sample to be used for a transmission electron microscope and when an electron beam is shone onto a location to be processed thereby, an amount of current of the electron beam passing through the processed part is detected so as to control the amount of ion beam processing.

In these methods disclosed in Japanese unexamined patent publications (KOKAI) Nos. H6-273297 and H8-5528, however, the sample to be measured must be thinned to a thickness through which the electron beam can pass, making it difficult to measure the film thickness of a thin-film formed on the supporting substrate such as in a conventional semiconductor device.

The inventors of the present invention, in order to solve the above-noted problem in the related art, has succeeded in developing a technology for calculating the film thickness of the thin-film to be measured by measuring a value of the substrate current flowing in the substrate when an electron beam is caused to strike or irradiate a thin-film formed on a supporting substrate, and calculating the film thickness of the thin-film based on reference data, and the applicant had already filed a patent application for this technology (Japanese unexamined patent publication (KOKAI) No. 2000-180143).

In this method, rather than measuring an amount of the electron beam passing through the sample, but a substrate current value is measured directly from the substrate, and thus it is possible to measure the thickness of even a thin-film formed on the supporting substrate.

FIG. 1 of the accompanying drawings is a block diagram showing a film-thickness measurement apparatus as disclosed in the Japanese unexamined patent publication (KOKAI) No. 2000-180143. This apparatus has an electron gun 3 shining an electron beam onto a thin-film 2 on a substrate 1, an electrode 4 disposed in contact with the bottom part of the substrate 1, and a current measuring part 5 that measures the substrate current value collected at the electrode 4.

The current measured at the current measuring electrode 5 is adjusted by a current amplifier 6 and a differential amplifier 7, and is converted to a digital signal by an A/D converter 9.

The film-thickness measuring apparatus further has a measured current storage part 10 that stores the measurement current value that has been converted to a digital signal, a calibration curve data storage part 11 that stores calibration curve data measured using an existing standard sample, and a calibration curve data comparator 12 that compares the calibration curve data with a measured current value.

A film-thickness measuring apparatus configured as described above has the effect of enabling measurement of the film thickness of films and further is effective for thin film and is more effective for ultra-thin films.

The invention noted in the Japanese unexamined patent publication 2000-180143 uses the following principle.

When a low-energy electron beam of between several hundred keV and several keV is made to strike a sample, secondary electrons are emitted from the region in the vicinity of the surface of the sample.

In general, conductors and semiconductors generally have a low capacity for emitting secondary electrons, while insulators have a large capacity for emission secondary electrons.

For example, in contrast to the secondary electron emission capacity of 0.9 or so of silicon, which is a semiconductor, a silicon oxide film, which is an insulator, has a secondary electron emission capacity of approximately 2.

Therefore, when an electron beam is caused to be irradiated at a semiconductor device in which a thin-film made of a silicon oxide film is formed on a surface of the silicon substrate, more secondary electrons are emitted from the silicon oxide film.

When this occurs, electron flow into the silicon oxide film from the silicon substrate to compensate for the secondary electrons emitted from the silicon oxide film.

That is, the substrate current that is a sum of the current arising because of the electron beam striking the silicon substrate and the compensating current flowing the substrate in the direction opposite thereto, flows through the silicon substrate.

FIGS. 2(*a*) and 2(*b*) are schematic representations of the above-noted principle.

As shown in FIG. 2(*a*), in the case in which a thin-film made of silicon oxide is formed onto a silicon substrate, if when one electron from an electron beam strikes the surface thereof, two electrons are emitted from the silicon oxide film as secondary electrons.

Because one electron is emitted from the silicon oxide film, in order to compensate for the electron emitted from the silicon oxide film, one electron flows into the silicon oxide film from the silicon substrate.

In this case, a substrate current flows in the silicon substrate in the direction opposite to that of the current due to the electron beam.

On the other hand, as shown in FIG. 2(*b*), in the case in which there is no silicon oxide film on the silicon substrate, when one electron beam electron strikes on the surface of the substrate, 0.9 electron is emitted from the silicon substrate as secondary electron emission.

For this reason, a substrate current having an amount formed by subtracting the amount of electrons as released from the amount of electrons thus striking the substrate, flows in the substrate in the direction identical to that of the current arising by the electron beam.

As described above, because there are few secondary electrons emitted when there is no silicon oxide film on the silicon substrate, the major portion of the current is attributed to the electron beam, but as the film thickness of the silicon oxide film increases, the compensation current increases.

However, because there is an increase in the resistance value of the silicon oxide film, which is an insulator, when the thickness of the silicon oxide film increases further, it becomes difficult for the compensation current to flow, so that there is a reduction in the substrate current.

FIGS. 3(a) and 3(b) shows show graphs illustrating the relationship between the substrate current value and film thickness.

As shown in FIG. 3(a), if a current in the direction of the current caused by the electron beam is taken as being a positive current, until the thickness of the silicon oxide film reaches a prescribed thickness d, there is a increases in the negative direction, after which the substrate current value decreases and converges to zero.

Because the Japanese unexamined patent publication (KOKAI) No. 2000-180143, deals with the measurement of gate oxide films or the like, which have a relatively small thickness of several nanometers, such as a super thin film, as shown in FIG. 3(b) there is a 1:1 relationship established between the substrate current value and the film thickness of the thin-film.

However, at large thickness in the range from several tens of nanometers to several thousands of nanometers, because the relationship between the substrate current value and the film thickness becomes 1:2 as shown in FIG. 3(a), it is discovered that there is a problem in that the measured substrate current value does not have a unique thickness of the thin-film when the substrate current is measured.

The above-noted problem remains in measuring a thickness of not only ultra-thin films but also of films having a wide range of thickness by applying the method disclosed in the Japanese unexamined patent publication (KOKAI) No. 2000-180143.

The present invention provides an improvement relative to the technology disclosed in the Japanese unexamined patent publication (KOKAI) No. 2000-180143 so as to solve the above-noted problem.

Accordingly, it is an object of the present invention to provide technology for measuring the film thickness of a film including a thin-film, formed on a substrate, and particularly to provide a technology for measuring the film thickness of films having a wide range of thickness.

SUMMARY OF THE INVENTION

In order to achieve the above-noted object of the present invention, the present invention adopts the following basic technical constitution.

Specifically, the present invention provides a method for measuring the film thickness of a film formed on a substrate by using the substrate current value of the current flowing in the substrate when an electron beam is irradiated at a film to be measured and formed on the substrate.

A basic technical conception of the present invention is a method for measuring a thickness of a film formed on a substrate by using a substrate current value of a current flowing in the substrate when an electron beam is irradiated at a film that is to be measured and formed on the substrate, wherein a first electron beam having a first energy and a second electron beam having a second energy being different from the first energy are respectively irradiated at a standard sample of a film made of a material which is similar or closer to that of the film to be measured with a certain thickness previously known and formed on the substrate, so as to detect a first standard substrate current value and a second standard substrate current value, respectively, thereby obtaining a reference data indicating a correlationship between the substrate current values and the thickness of the standard sample of film; further wherein, the first and second electron beams are respectively irradiated at a film to be measured and formed on the substrate, so as to detect a first test substrate current value and a second test substrate current value, respectively; and further wherein a thickness of the film to be measured is measured by processing the first and the second test substrate current values and the reference data, with a prescribed calculation manner.

More specifically, the method for measuring a thickness of a film formed on a substrate in the present invention comprising the following operations such as;

obtaining reference data indicating a relationship between a reference function, which comprises, as variables, the first standard substrate current for a case in which the first electron beam is irradiated at the standard sample of film and the second standard substrate current for a case in which the second electron beam is irradiated at the standard sample of film, and a film thickness of the standard sample of film;

obtaining a first test substrate current value of a current flowing in the substrate when the first electron beam is irradiated at the film to be measured which is formed on the substrate;

obtaining a second test substrate current value of a current flowing in the substrate when the second electron beam is irradiated at the film to be measured which is formed on the substrate; and calculating a film thickness of the film to be measured, based on the first test substrate current value and the second test substrate current value, taking into consideration the reference data.

In the step of obtaining the reference data in the above-mentioned film thickness measuring method of the present invention, the reference function is held in a form of $f(a,b)$ (where a and b indicate, respectively, the standard substrate currents for the cases in which the first and second electron beams are irradiated at the standard sample, respectively), and the relationship of a thickness d of the standard sample of film and the reference function $f(a,b)$ is held in the form $d=\Gamma[f(a, b)]$.

And further in the step of calculating the film thickness, by substituting the first test substrate current value for a and the second test substrate current value for b of the equation $d=\Gamma[f(a, b)]$, respectively, the film thickness d of the film under measurement is calculated.

According to this method, even though a thickness of a film is fallen into a range in which the correlation between the substrate current value at a given energy and the film thickness is not defined with 1:1 relation, by using a plurality of electron beam each having the respective energy being different from each other, it is possible to establish a 1:1 correlation between a function having the substrate current values at a plurality of energies of the electron beams as variables and the film thickness, thereby enabling the measurement of a wide range of film thicknesses.

The substrate current is the sum of a current generated due to the electron beam irradiation at the substrate and a compensating current indicating the amount of electrons flowing out of the substrate into the film to compensate for the secondary electrons emitted from the film when it is irradiated by the electron beam.

The substrate current value can be the raw data obtained by measuring the substrate current flowing in the substrate when an electron beam is irradiated at the film to be measured, and can also be data obtained by adjusting the above-noted data using amplification or the like, or can alternatively be data obtained by converting these above-noted data to a digital signal. The substrate current value can further also be any other form of data that is derived from the measured substrate current value.

The energy (acceleration potential) of the electron beam used in this method is preferably of a level such that the electron beam does not pass through the substrate, for example approximately up to 10 keV.

This method is preferably applied to the measurement of an insulating film, but is not restricted to insulating films, and thus the method being usable in the measurement of film thickness of a film made of a material which can emit secondary electrons greater in number than the impinging electrons when an electron beam is irradiated at the film, a film made of a material having a resistance value which can become high when the thickness thereof exceeds a pre-scribed film thickness, or a film made of a material having both of these characteristics.

It is further possible to apply the method to measurement of the film thickness of a thin-film formed on a semiconductor or conductive substrate.

The reference function can be a function that reflects the difference between the first and the second substrate current values, and the calculation step of the present invention can calculate the difference, in the same manner as for the reference function, between the first and the second substrate current values, the thickness of the film being calculated by making a comparison of the calculated difference with the reference function.

In this case, the term difference can refer to the difference or ratio between substrate current values, and can be any function that represents the different part between those substrate current values.

The reference function can be a difference between each of the substrate current values, and the calculation step can calculate the difference between the first substrate current value and the second substrate current value, as well as the thickness of the film being calculated by making a comparison between the calculated difference and the reference function.

In the step of obtaining the first test substrate current value of the present invention, a positional information regarding a position at which an electron beam having a first energy is irradiated at a film to be measured, can be obtained in correspondence to the first test substrate current value, and in the step of obtaining the second test substrate current value in the present invention, a positional information regarding a position at which an electron beam having a second energy is irradiated at a film to be measured, can also be obtained in correspondence to the second test substrate current value.

In the step of calculating the film thickness in the present invention, the thickness of the film under measurement can be calculated from the first test substrate current value and the second test substrate current value each corresponding to the same position.

Note that, in the method for measuring a thickness of a film of the present invention, a plurality of the standard samples of films each having a previously known thickness being different from each other, are used so as to obtain a reference data showing a relationship between the substrate current and a thickness of a standard sample of film a part of the reference function of the present invention.

As mentioned above, in the present invention, in order to measure the thickness of a film, each one of the first test substrate current value and the second test substrate current value is respectively measured with a positional information indicating a position at which each one of the first and second electron beams is respectively irradiated at the film to be measured, respectively.

More especially, in the present invention, as explained above, the reference function is a difference between each of the standard substrate current values, and the calculation step calculates a difference between the first test substrate current value and the second test substrate current value and determines the film thickness by comparing the calculated difference in the test substrate current value with the reference function.

Further in the method for measuring the thickness of a film of the present invention, as explained above, the method can include the following steps such as;

in the step of obtaining the first test substrate current value, a positional information showing a position on which the first electron beam is irradiated at the film to be measured, is obtained in associative relationship with the first test substrate current value;

in the step of obtaining the second test substrate current value, a positional information showing a position on which the second electron beam is irradiated at the film to be measured, is obtained in associative relationship with the second test substrate current value; and in the step of calculating a thickness of a film, a thickness of the film to be measured is calculated utilizing the first and second test substrate current values corresponding to one and the same position at which the irradiation had been carried out, respectively, taking the reference data, into the account.

On the other hand, in the present invention, the reference function can be a ratio between each of the standard substrate current values, and the calculation step can calculate a ratio between the first test substrate current value and the second test substrate current value and determine the film thickness by comparing the calculated ratio in the test substrate current value with the reference function.

Next, another embodiment of a method for measuring a thickness of a film to be measured will be explained hereunder.

That is, the present invention further provides a separate method for measuring the thickness of a film, which uses the value of the substrate current flowing in a substrate when an electron beam is caused to be irradiated at a film under measurement that formed on a substrate.

This method has;

a step of obtaining a first reference data indicating a relationship between a first standard substrate current value in the case in which an electron beam of a first energy is irradiated at a standard sample and a film thickness, a step of obtaining a first test substrate current value of a current flowing in a substrate when an electron beam of a first energy is irradiated at a film to be measured which is formed on a substrate, a step of extracting film thickness candidates for the film under measurement, based on the first test substrate current value taking the first reference data into the account, a step of obtaining a second reference data indicating a relationship between a standard substrate current value in the case in which an electron beam having a second energy being different from the first energy is irradiated at a standard sample of a film and a film thickness, a step of obtaining a second test substrate current value of a current flowing in a substrate when an electron beam having a second energy is irradiated at a film to be measured and formed on the substrate, and a step of identifying a film thickness of a film from the film thickness candidates based on the second test substrate current value taking the second reference data, into the account.

According to this method, even in a case in which the film thickness is in a range in which there is not a 1:1 correlation between the substrate current value at a given energy and the film thickness, it is possible to select a candidate from the correlation between the substrate current value at a given energy and the film thickness, and to uniquely establish the film thickness from the correlation function between the substrate current value at another energy and the film thickness, thereby enabling the measurement of a wide range of film thicknesses.

The present invention also provides a method having;

a step of obtaining a first reference data indicating a relationship between a first standard substrate current value and a film thickness, in the case in which a first electron beam having a first energy is irradiated at a standard sample of film, a step of obtaining a first test substrate current value of current flowing in a substrate when the first electron beam is irradiated at a film to be measured which is formed on a substrate, a step of obtaining a second reference data indicating a relationship, in the case in which the first test substrate current value has correspondence to a plurality of film thicknesses in the first reference data, between the second standard substrate current and a film thickness for the case in which a second electron beam having a second energy being different from the first energy is irradiated at the standard sample of film, a step of further obtaining a second test substrate current value of current flowing in the substrate when the second electron beam is irradiated at the film to be measured, and a step of calculating the thickness of the film based on the first test substrate current value and the second test substrate current value, taking the first reference data and the second reference data into the account.

According to this method, even in a case in which the film thickness is in a range in which there is not a 1:1 correlation between the substrate current value at a given energy and the film thickness, it is possible to select a candidate from the correlation between the substrate current value at a given energy and the film thickness, and to uniquely establish the film thickness from the correlation function between the substrate current value at another energy and the film thickness, thereby enabling the measurement of a wide range of film thicknesses.

The present invention further provides an apparatus for measuring the thickness of a thin-film using a substrate current value flowing in a substrate when an electron beam is caused to be irradiated at a thin-film that is being measured, which is formed on the substrate.

The apparatus for measuring the thickness of a film of the present invention, is configured so as to use a substrate current value flowing in a substrate when an electron beam is caused to be irradiated at the film that is measured which is formed on the substrate, and the apparatus comprises:

a reference data storage section, which stores reference data indicating a relationship between a reference function, which has, as variables, a first standard substrate current value for a case in which a first electron beam having a first energy, is irradiated at a standard sample of film and a second standard substrate current for a case in which a second electron beam having a second energy, is irradiated at the standard sample of film, and a film thickness of the standard film of sample;

an electron beam emission section capable of causing the first and second electron beams to irradiate at a film under measurement which is formed on the substrate, respectively;

an electron beam controller, which controls an energy of the respective electron beams that is emitted by the electron beam emission section;

a current measurement section, which measures a first test substrate current value of a current flowing in the substrate when the film to be measured and formed on the substrate, is irradiated by the first electron beam and a second test substrate current value of a current flowing in the substrate when it is irradiated by the second electron beam;

a measured data recording section, which records the first test substrate current value in association with the first electron beam and the second test substrate current value in association with the second electron beam, respectively; and a calculation processor, which calculates a thickness of the film under measurement based on the first test substrate current value and the second test substrate current value, taking the reference data into the account.

In the above, the reference data storage section holds the reference function in the form of f(a,b) (where a and b indicate, respectively, the first and second standard substrate currents for cases in which the first and second electron beams, respectively is irradiated at the standard sample of film); and the relationship of a thickness d of the standard sample of film and the reference function f(a,b) is held in a form d=Γ[f(a, b)].

On the other hand, the calculation processor calculating the film thickness d of the film under measurement by substituting the first test substrate current value and the second test substrate current value for a and b in the equation d=Γ[f(a, b)], respectively.

According to this apparatus, even though a thickness of a film is fallen into a range in which the correlation between the substrate current value at a given energy and the film thickness is not defined with 1:1 relation, it is possible to establish a 1:1 correlation between a function having the substrate current values at a plurality of energies of the electron beams as variables and the film thickness, thereby enabling the measurement of a wide range of film thicknesses.

This apparatus can further include an incident position controller that controls the position of incidence at which the electron beam is irradiated at the film, the measured data recording section can record the first and second test substrate current values in association with the position of incidence at which the electron beam is irradiated at the film to be measured as well, and the calculation section can calculate the thickness of the film at the position of incidence thereon, based on the first and second test substrate current values associated with the position of the above-mentioned incidence.

The current measurement section can have an electrode provided so as to make contact with the substrate, and can measure the test substrate current value of current flowing in the electrode.

The reference data storage section can store as a reference data, a function that reflects the difference between the first and second standard substrate current values, and the calculation section can calculate the difference between the first test substrate current value and the second test substrate current value in the same manner as the reference function, and can calculate the thickness of the film by comparing the calculated difference with the reference function.

The reference data storage section can store as reference function, the difference between each of the standard substrate current values, and the calculation section can calculate the difference between the first test substrate current value and the second test substrate current value, and can calculate the thickness of the film by comparing the calculated difference with the reference function.

The present invention further provides a program for execution by a computer of processing for measuring the thickness of a film using the test substrate current value of a current flowing in a substrate when an electron beam is caused to be irradiated at a film to be measured that is formed on the substrate.

This program causes a computer to execute the following operations including;

processing for obtaining reference data indicating a relationship between a reference function having, as variables, a first standard substrate current value for the case in which a first electron beam of a first energy is irradiated at a standard sample of film and a second standard substrate current value for the case in which a second electron beam of a second energy which is different from the first energy, is irradiated at strikes the standard sample of film, and a film thickness;

processing for obtaining a first test substrate current value of the current flowing in the substrate when the first electron beam is irradiated at a film being measured that is formed on the substrate;

processing for obtaining a second test substrate current value of the current flowing in the substrate when the second electron beam is irradiated at a film being measured that is formed on the substrate; and processing for calculating the thickness of the film being measured, based on the first test substrate current value and the second test substrate current value, taking the reference data into the account.

In the processing for obtaining the reference data, the reference function is held in the form of f(a,b) (where a indicates a first standard substrate current for the case in which a first electron beam of the first energy is irradiated at a standard sample of film, and b indicates a second standard substrate current for the case in which a second electron beam of a second energy being different from the first energy is irradiated at the standard sample of film), and the relationship of the standard sample thickness d and the reference function f(a,b) is held in the form d=Γ[f(a, b)].

In the processing for calculating the film thickness, the program of this invention causes a computer to execute to calculate a thickness of a film to be measured by substituting the first test substrate current value for a in the above-mentioned formula of d=Γ[f(a, b)], and the second test substrate current value for b in the above-mentioned formula thereof.

The present invention further provides a program for execution by a computer of processing for measuring the thickness of a film using the substrate current value of a current flowing in a substrate when an electron beam is caused to be irradiated at the film to be measured that is formed on the substrate.

This program causes a computer to execute an operation for controlling a data controller which comprising;

a reference data obtaining means that obtains reference data indicating a relationship between a reference function having, as variables, a first standard substrate current for the case in which a first electron beam of a first energy is irradiated at a standard sample of film and a second standard substrate current for the case in which a second electron beam of a second energy different from the first energy, is irradiated at the standard sample of film, and a film thickness of the standard film;

a measured data obtaining means that obtains the test substrate current value of current flowing in the substrate when an electron beam is irradiated at a film to be measure that is formed on the substrate; and a calculation processing means that calculates the thickness of the film to be measured based on the obtained test substrate current value taking the reference data into the account.

And more specifically, the program of the present invention causes a computer to execute the following operations such as;

processing for causing the reference data obtaining means to obtain reference data;

processing for causing the measured data obtaining means to obtain a first test substrate current value of current flowing in the substrate when a first electron beam of the first energy is irradiated at the film;

processing for causing the measured data obtaining means to obtain a second test substrate current value of current flowing in the substrate when a second electron beam of the second energy being different from the first energy is irradiated at the film; and processing for causing the calculation processing means to calculate the thickness of the film under measurement based on the first test substrate current value and the second test substrate current value, with taking the reference data into the account.

The present invention further provides a computer-readable recording medium onto which is recorded a program for causing a computer to execute processing for measuring the thickness of a film to be measured using the test substrate current value of current flowing in a substrate when an electron beam is caused to be irradiated at the film to be measured that is formed on the substrate.

This recording medium can record thereunto a program for causing a computer to execute;

processing for obtaining reference data indicating a relationship between a reference function having, as variables, a first standard substrate current for the case in which a first electron beam of a first energy is irradiated at a standard sample of film and a second standard substrate current for the case in which a second electron beam of a second energy being different from the first energy is irradiated at the standard sample of film, and a film thickness;

processing for obtaining a first test substrate current value of the current flowing in the substrate when a first electron beam of the first energy is irradiated at a film being measured that is formed on the substrate;

processing for obtaining a second test substrate current value of the current flowing in the substrate when a second electron beam of the second energy being different from the first energy is irradiated at the film being measured that is formed on the substrate; and processing for calculating the thickness of the film being measured, based on the first test substrate current value and the second test substrate current value, taking the reference data into the account.

Arbitrary combinations of above-described constituent elements, conversions of the above-noted representations of the present invention between the forms of a method, an apparatus, a system, a recording medium, and a computer program or the like likewise are valid aspects of the present invention.

BRIEF DESCRIPTION OF THE DRAWINGS

FIG. 4 is a flowchart showing the process of measuring the substrate current in an embodiment of the present invention.

DETAILED DESCRIPTION OF THE PREFERRED EMBODIMENTS

Embodiments of the present invention are described below in detail, with references made to relevant accompanying drawings.

FIG. 4 is a flowchart showing the process for measuring the substrate current flowing in the substrate when an electron beam is irradiated at a film on a substrate as a first embodiment of the present invention.

First, the energy of the electron beam that is to be irradiated at the film on the substrate is set (step S10).

Next, the position at which the electron beam is irradiated on the film formed on the substrate is set (step S12).

Then, under the conditions as set at step S10 and step S12, the electron beam is emitted for irradiate the film (step S14).

Following this, the substrate current value flowing in the substrate when the beam is irradiated at the film is measured (step S16).

The measured value of substrate current is adjusted by amplification or the like (step S18), and the adjusted substrate current value is recorded as measured data associated with the energy of the electron beam and with the position at which the electron beam had been irradiated (step S20).

After this, a judgment is made as to whether or not measurement has been completed over all of the required ranges (step S22) and, if the measurement has not been completed (No result at step S22), return is made to step S12, and a new position at which the electron beam irradiation has to be done, is set.

If all of the required positions on the film has been measured (Yes result at step S22); a judgment is made as to whether or not measurements have been completed with electron beams of all required energies (step S24).

If measurements have not been completed (No result at step S24), return is made to step S10, at which the energy is set anew.

If measurement has been completed with electron beams of all required energies (Yes result at step S24), the measurements are ended.

In this measurement, while the electron beam can be set to any number of different energies, it must be set to at least two different energies.

Figure 1:
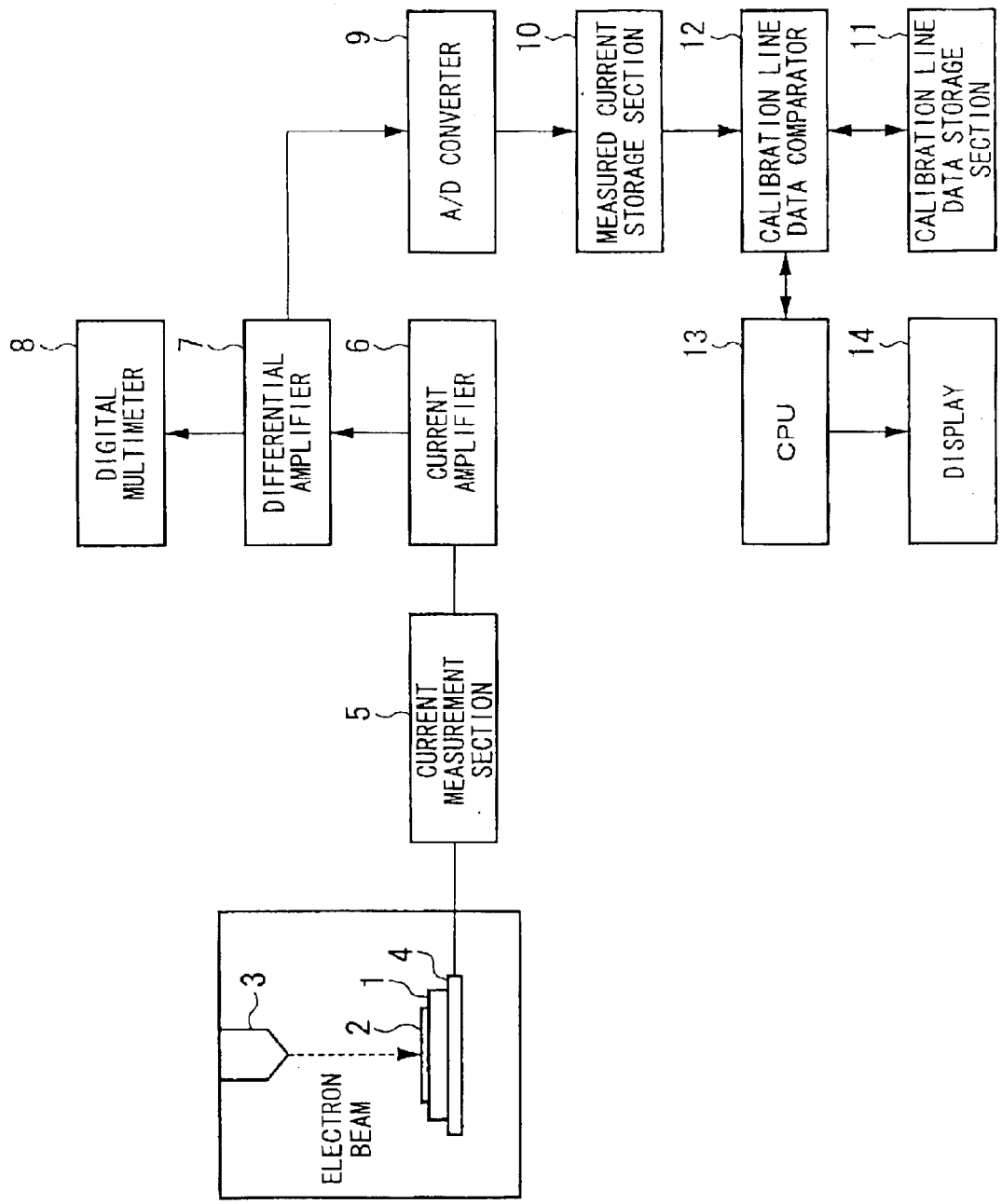
FIG. 1 is a block diagram showing a film measuring apparatus of the past.
Figure 2A:
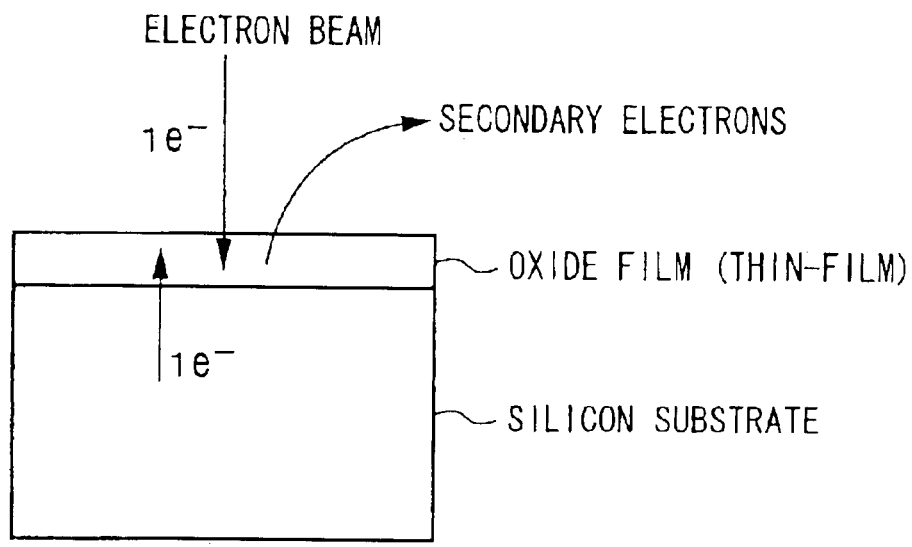
FIGS. 2(a) and 2(b) are schematic representations illustrating the principle of a substrate current flowing in a substrate when an electron beam strikes a film formed thereon.
Figure 2B:
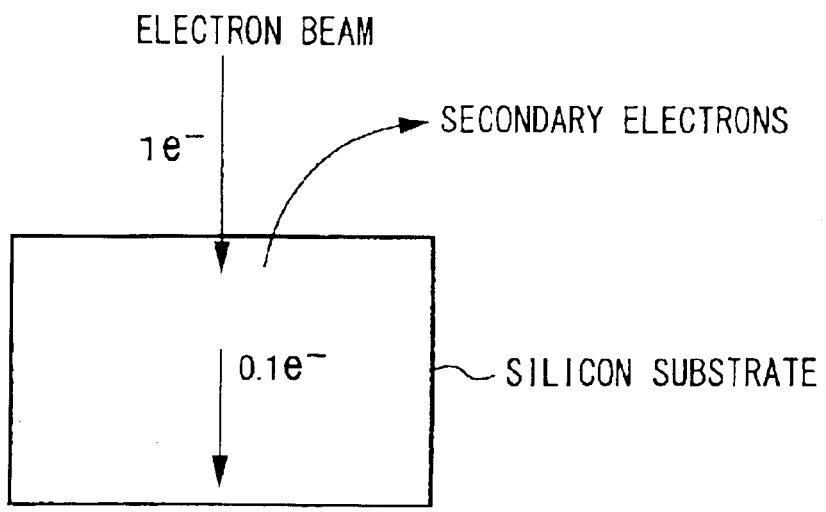
Figure 3A:
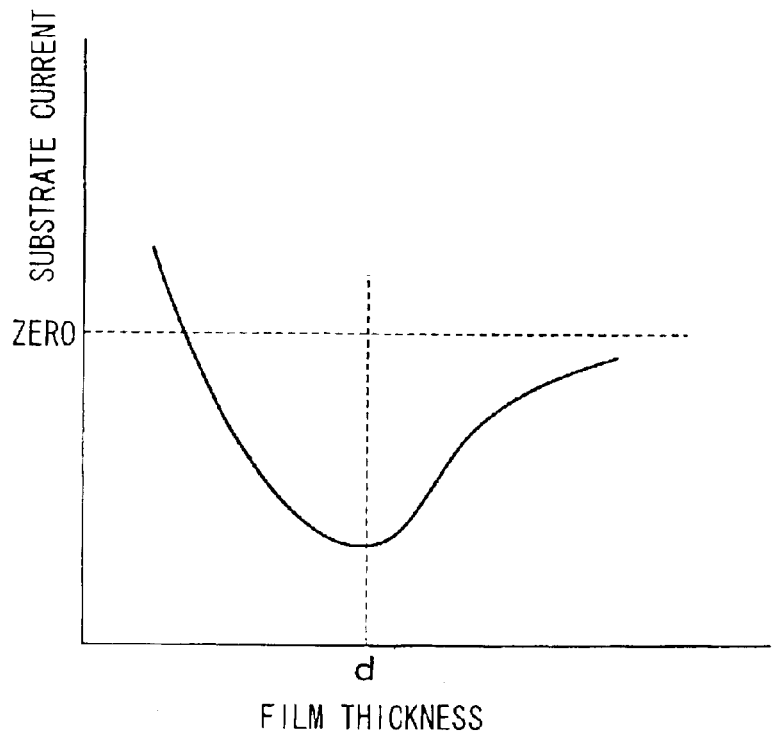
FIGS. 3(a) and 3(b) provides graphs showing a schematic representation of the relationship between the substrate current and the film thickness.
Figure 3B:
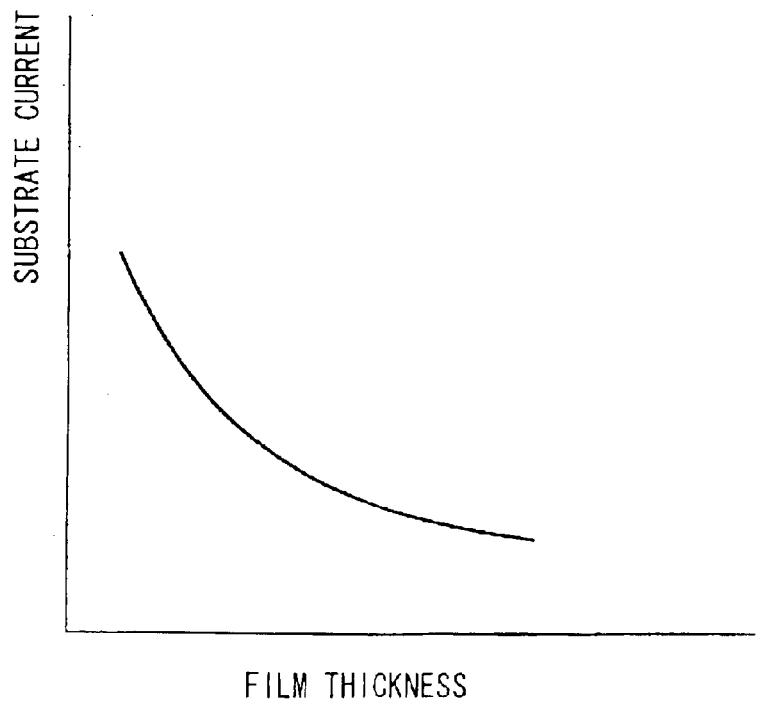
Figure 5:
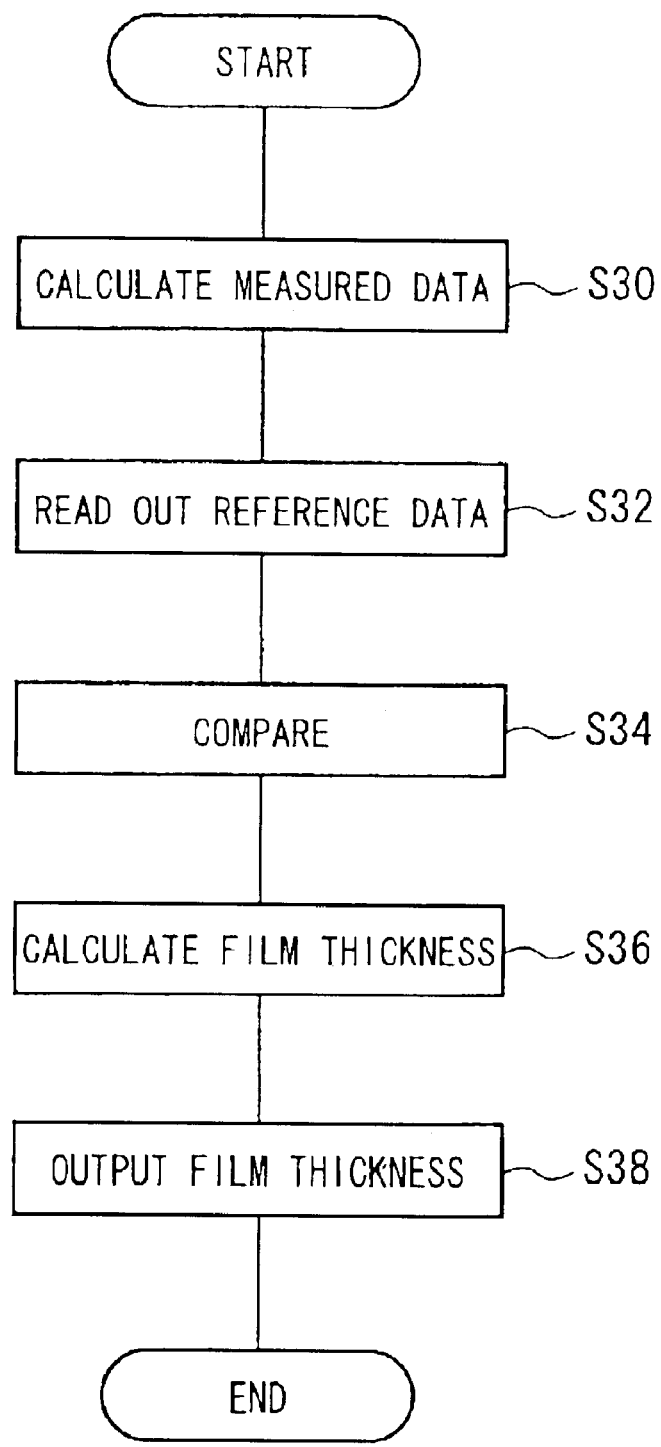
FIG. 5 is a flowchart showing the process of calculating the film thickness of a film under measurement based on the measured data, giving consideration to reference data.

FIG. 5 is a flowchart showing the process of calculating the thickness of a film under measurement based on the measured data, with consideration given to the reference data, which indicates a relationship between a reference function having, as variables, a plurality of standard substrate currents for a plurality of cases of using electron beams each having different energy and being irradiated at a standard sample of film, respectively, and a thickness of the standard sample of film.

First, for each one of positions at which the electron beam is irradiated, a calculation is made of the difference in the substrate currents for the cases in which electron beam each having the respective energies being different from each other are irradiated at the film, respectively (step S30).

Next, the reference data is read out (step S32) and a comparison is made between the substrate current difference and the reference data (step S34).

The thickness of the film, which has a correlation to the reference function associated with the difference in the substrate current values, is calculated (step S36).

And finally, the calculated thickness of the film is output in association with the positional data at which the electron beam had been irradiated (step S38).

The configuration of a thin-film measuring apparatus that implements the above-described film measurement method is described below, with reference to FIG. 6, which is a block diagram of a thin-film measuring apparatus according to an embodiment of the present invention.

Figure 6:
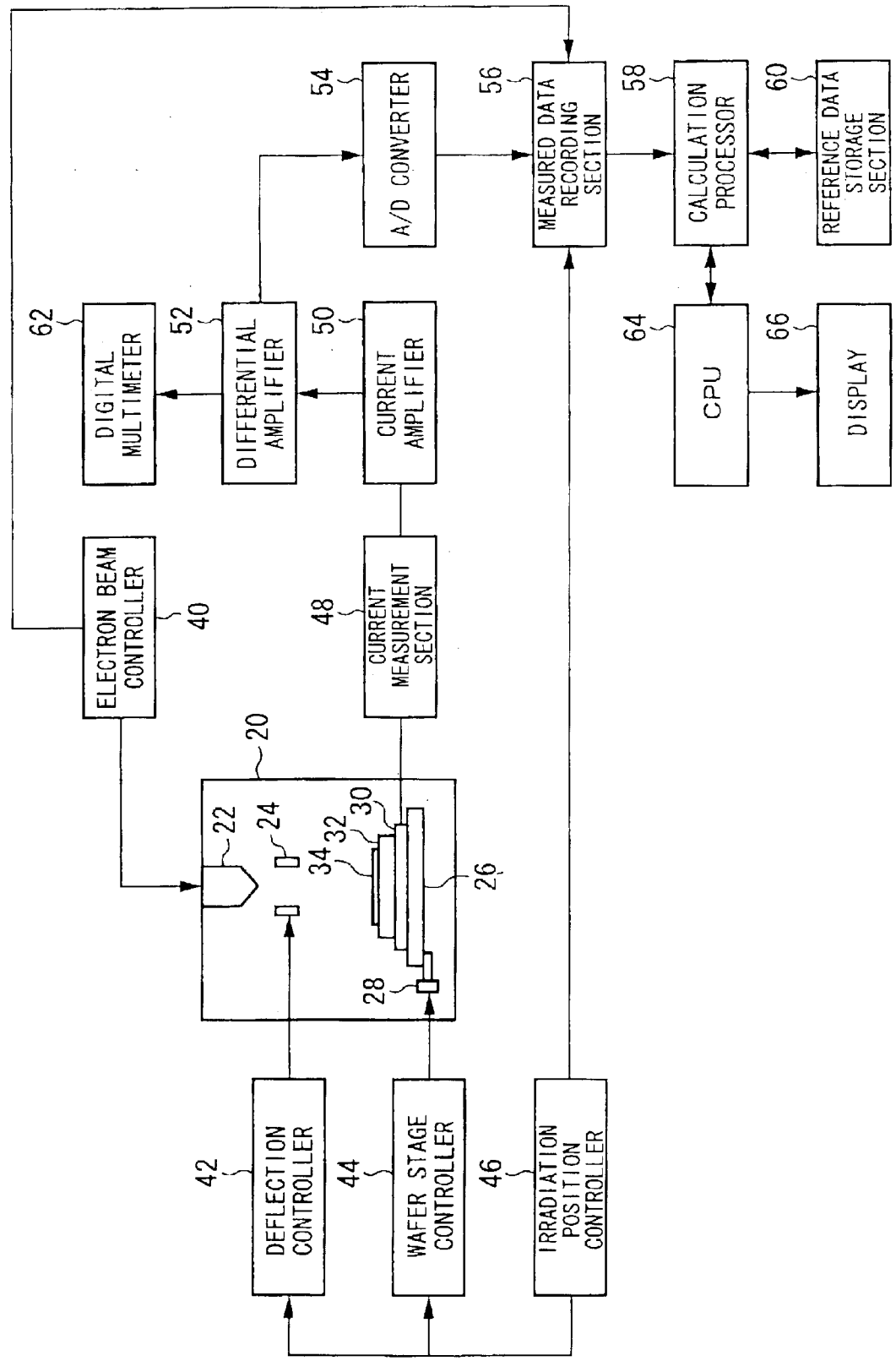
FIG. 6 is a block diagram showing a film measuring apparatus according to an embodiment of the present invention.

The thin-film measuring apparatus 18 shown in FIG. 6 has a electron beam processor 20, an electron beam controller 40, a deflection controller 42, a wafer stage controller 44, a position of irradiation 46, a current measurement section 48, a current amplifier 50, a differential amplifier 52, an A/D converter 54, a measured data recording section 56, a calculation processor 58, a reference data storage section 60, a digital multimeter 62, a CPU 64, and a display 66.

The electron beam processor 20 has an electron gun 22 which can generate electron beam, a deflection section 24 that deflects the electron beam so as to be irradiated at a prescribed region on a sample thereon, a wafer stage 26 that holds the sample, and a wafer stage driver 28, which drives the wafer stage 26.

In this embodiment, the electron beam processor 20 includes an electrode 30 disposed at the wafer stage 26 and which detects a current flowing through a sample of film to be measured.

Although not illustrated, the electron beam processor 20 has an accelerating potential generator, and the electron beam controller 40 controls the accelerating potential generator so that an electron beam having a prescribed accelerating potential, is emitted from the electron gun 22.

The deflection controller 42 controls the deflection section 24. The wafer stage controller 44 controls the wafer stage driver 28, so as to move the wafer stage 26 to a prescribed position.

The position of irradiation controller 46 controls the deflection controller 42 and the wafer stage controller 44 so that the electron beam can be irradiated at a prescribed position of the sample of film.

Although not illustrated, the film thickness measuring apparatus 18 can have an electron beam movement means, and the position of irradiation controller 46 can control the electron beam movement means so as to move the electron gun so that the electron beam can be irradiated at a prescribed position of the sample of film.

The current measurement section 48 is connected to the electrode 30 and measures the substrate current detected by the electrode 30.

The current amplifier 50 amplifies the measured substrate current value. The differential amplifier 52 has a function of adjusting offset, and removes an offset attributed to leakage current of the film thickness measuring apparatus 18, while providing further amplification of the substrate current value.

The differential amplifier 52 uses the difference between the substrate current value when there is no electron beam to be irradiated at a sample of film and the substrate current value when there is an electron beam to be irradiated at the sample of film so as to perform offset voltage compensation.

The digital multimeter 62 displays the adjusted substrate current value.

The A/D converter 54 converts the substrate current value adjusted by the differential amplifier 52 to digital form. The measured data recording section 56 records the digitally converted substrate current value.

The measured data recording section 56 obtains energy data such as the accelerating potential of the emitted electron beam from the electron beam controller 40 or the like, and obtains position data about a position at which the electron beam is irradiated, from the position of incidence controller 46.

The measured data recording section 56 records thus obtained energy data and position data in association with measured substrate current value.

The reference data storage section 60 stores reference data indicating the relationship between a reference function having, as variables, a plurality of standard substrate currents for a plurality of cases in which electron beans each having the respective energy in the accelerating potential being different from each other, are irradiated at a standard sample of film, respectively, and a thickness of the standard sample of film.

The reference data can be obtained by associating the substrate current value measured when an electron beam is irradiated at the standard sample of film having a thickness which is already known, utilizing the film thickness measuring apparatus 18, with the known film thickness.

The film that is part of the standard sample is preferably formed of the same material as the film 34 to be measured, and can also be formed from a different material that has the same secondary electron emission capacity as the film 34.

In another example, the reference data can be determined by a theoretical calculation that takes into consideration the secondary electron emission capacity of the film to be measured and the substrate 32.

In the case of a thin-film 34 made of SiON, it is possible to make the determination about the reference data, by a proportional calculation of the substrate current values measured for $SiO_2$ and SiN, respectively.

The calculation processor 58 performs a calculation of the thickness of the film 34 under measurement from the measured substrate current value, taking the reference data stored in the reference data storage section 60 into the account.

The CPU 64 performs control of the overall film thickness measuring apparatus 18. The display 66 displays the calculation results.

Figure 7A:
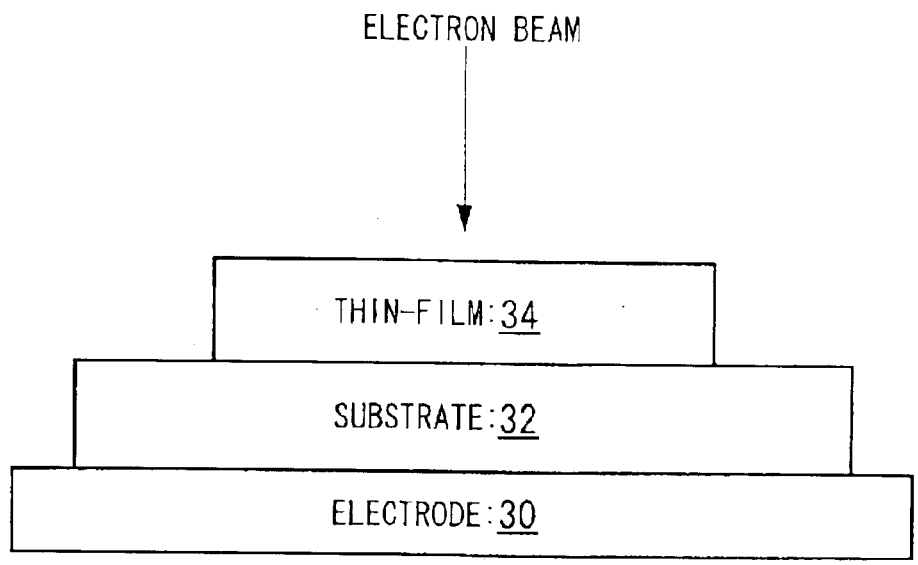
FIGS. 7(a) and 7(b) are cross-sectional views of a sample, the film thickness of which is measured by a film measuring apparatus.
Figure 7B:
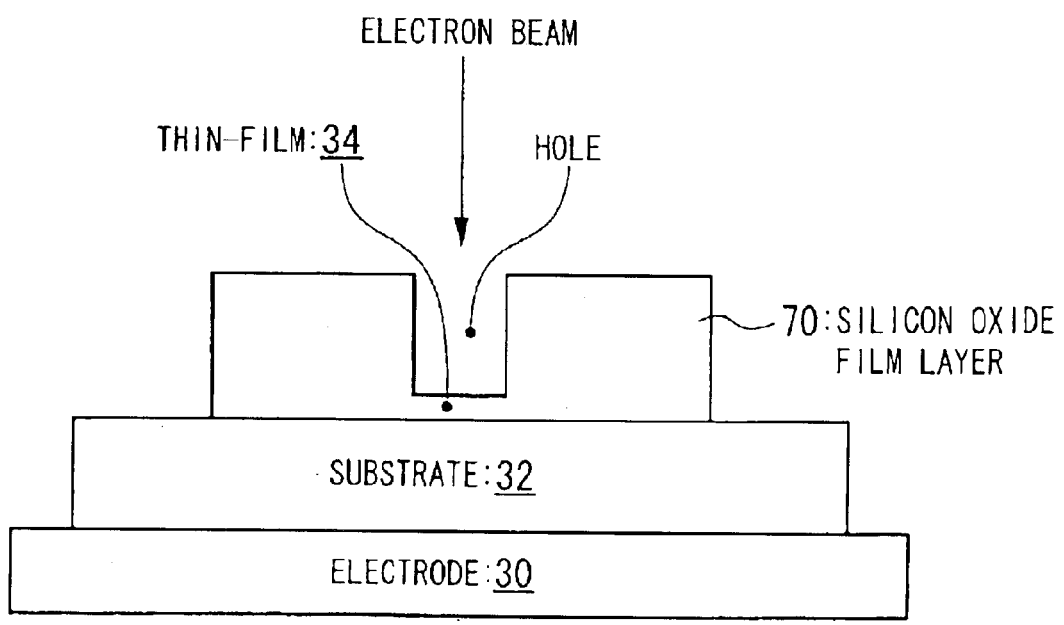

FIGS. 7(a) and 7(b) are cross-sectional views showing an example of a sample that is to be measured by a film measuring apparatus 18 according to an embodiment of the present invention.

As shown in FIG. 7(a), the film thickness measuring apparatus 18 measures the thickness of a film, for example, a thin-film 34 to be measured and formed on a substrate 32.

It is preferable that the substrate 32 be a conductor or a semiconductor. In this embodiment, the substrate 32 is made of silicon.

It is preferable that the thin-film 34 be made of a material having a secondary electron emission capacity of 1 or greater so that, when the electron beam is irradiated at the thin-film 34, the number of the secondary electrons emitted from the sample of film is outnumber the number of the electrons irradiated thereat.

Because the secondary electron emission capacity of an insulator is generally greater than 1, it is preferable that the thin-film 34 be an insulator.

The thin-film 34 can be made, for example, of $SiO_2$ (a silicon oxide film, including materials that include P or B), SiN (silicon nitride film), SiON (silicon oxynitride film), SiOF (fluorine-added silicon oxide film), SiONF (fluorine-added silicon oxinitride film), USG (undoped silicate glass), BPSG (boron phosphate silicate glass), PSG (phosphosilicate glass), a polymer such as an organic high polymer, an inorganic oxide film, silicide, nitride film, a ferroelectric substance, a polyimide, resist, fluorocarbon, carbon, protein, DNA, SOG (spin on glass), FOX (flowable oxide), parylene, cytop, BCB (bensocyclobutene), HSQ (hydrogen silsequinxane), MSQ (methyl silsesquinxane), or low-dielectric constant (low-k) material as "Silk "(Registered Trademark owned by Dow Chemical).

In this embodiment, the thin-film 34 are formed of a silicon oxide film.

The thin-film measuring apparatus 18, as shown in FIG. 7(b), can also be used to measure a thin-film 34 formed at the bottom part of a hole formed in a silicon oxide film layer 70 deposited on a substrate 32.

Figures 8, 9:
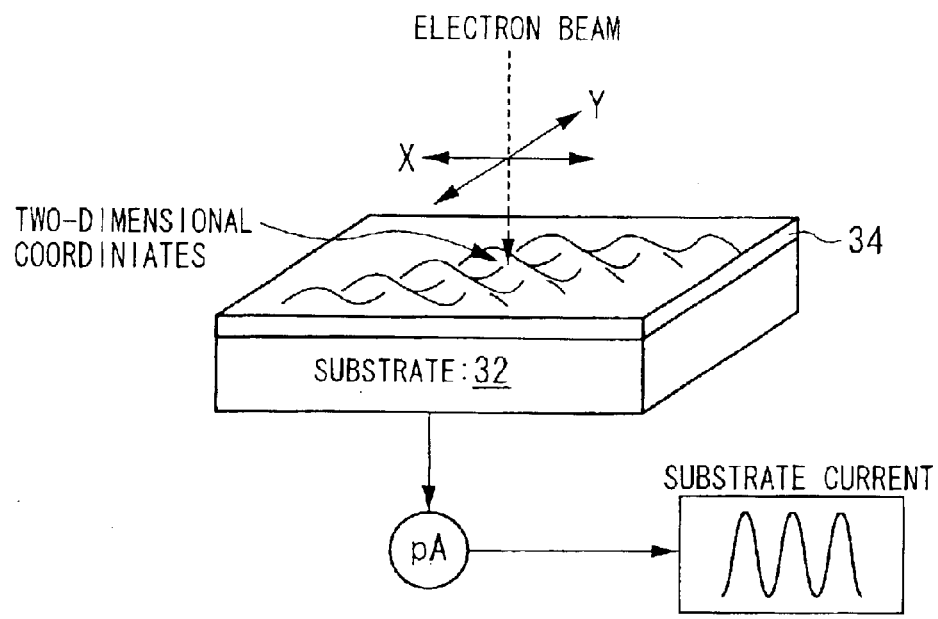
FIG. 8 is a schematic representation of the scanning of an electron beam over a sample.
FIG. 9 is a drawing showing the internal configuration of a reference data storage section.

FIG. 8 provides a schematic representation of the scanning of an electron beam over a sample.

The irradiation position controller 46 which controls a position at which the electron beam is irradiated, by controlling the wafer stage controller 44 and deflection controller 42 or the like, performs a two-dimensional scan of the electron beam in the x and y directions over the sample.

Although in the case of a flat film under measurement, it is not absolutely necessary for the electron beam to be perpendicular relative to the measured surface, it is preferable that the electron beam should be irradiated at every position in the sample of film with the same angle relative thereto over the entire measured region.

By doing this, because it possible to maintain the same quantity of emitted secondary electrons, it is possible to accurately calculate the film thickness from the measured substrate current value.

In the case of measuring the thickness of a thin-film formed at the bottom of a hole or trench, it is preferable that the electron beam is perpendicularly maintained, so that the electron beam sufficiently reaches the bottom part directly.

In such cases, rather than deflecting the electron beam, in order to assure the perpendicularity of the electron beam to a surface of the film to be measured, it is preferable that the electron beam be scanned by moving either the wafer stage 26 or the electron gun 22.

The film thickness measuring apparatus 18 measures the substrate current value as the electron beam is scanned over the sample in this manner, and stores the measured substrate current values into the measured data storage section 56 in association with the positions of the irradiation by the electron beam.

FIG. 9 is a drawing showing the internal configuration of the reference data storage section 60.

The reference data storage section 60 stores, in correspondence to the film thicknesses d1, d2, d3, and so forth, the first standard substrate current value Ir (E1) for the case in which a first electron beam having a first energy E1 is irradiated at the standard sample of film, the second standard substrate current value Ir (E2) for the case in which a second electron beam having a second energy E2 is irradiated at the standard sample of film, and the difference [Ir (E1)–Ir (E2)] between the first standard substrate current value Ir (E1) and the second standard substrate current value Ir (E2).

The reference data storage section 60 can alternatively store the ratio [Ir (E1)/Ir (E2)] of the first standard substrate current value Ir (E1) and the second standard substrate current value Ir (E2) in associative correspondence with the thickness of the standard sample of film, the thickness of which being already known, and can further alternatively store any reference function determined from the first standard substrate current value Ir (E1) and the second standard substrate current value Ir (E2) in associative correspondence with the film thickness of the standard sample of film.

Although in the case of this embodiment, the standard substrate current values at two different energies are used as the reference data, the reference data storage section 60 can store a reference function determined from such standard substrate current values obtained by using electron beams having three or more different energies, in associative correspondence with a thickness of the standard sample of film.

It is preferable that the reference function be such that there is a 1:1 relationship with film thickness over the required film thickness measurement range.

The operation of the film measuring apparatus 18 according to this embodiment of the present invention is described below, with reference being made to FIG. 6 through FIG. 9.

In FIG. 6, a substrate 32 onto which a thin-film 34 to be measured is formed is placed onto the electrode 30 on the wafer stage 26 as a sample. The electron beam controller 40 controls the accelerating potential generator so that an electron beam having the first energy E1 is irradiated at the sample from the electron gun 22.

The irradiation position controller 46 controls the wafer stage controller 44 and the deflection controller 42 so that the electron beam is irradiated at a prescribed position of the sample of film.

The electron beam controller 40 outputs a first energy E1 to the measured data recording section 56 and the irradiation position controller 46 outputs the positional information of a place at which the electron beam is irradiated, to the measured data recording section 56.

When the electron beam of the first energy E1 from the electron gun 22 is irradiated at the sample of film, secondary electrons are emitted from the sample of film.

For this reason, in order to compensate for the secondary electrons emitted from the thin-film 34, electron flow from the substrate 32 into the thin-film 34, so that a compensation current flows in the substrate 32.

In the substrate 32, there is a current in the flowing in the substrate 32 generated by a portion of the electron beam that is not irradiated at the sample out of the electron beam generated from the electron gun 22 directed at the substrate 32.

The current flowing in the substrate is the sum of these currents. The electrode 30 detects the substrate current, and the current measurement section 48 measures the substrate current value.

The measured standard substrate current value is adjusted by the current amplifier 50, the differential amplifier 52, and the A/D converter 54.

The measured data recording section 56 stores digitally converted substrate current value in associative correspondence with the first energy E1 and position of incidence data.

The irradiation position controller 46 controls the position of the irradiation of the electron beam at the sample of film and the measurement of the substrate current value at each one of the position of the irradiation, is repeated at each position.

The measured data recording section 56 stores the substrate current values at each of the positions in associative correspondence with the first energy E1 and the irradiation position data.

When the measurements of the substrate current values using the electron beam of the first energy E1 are completed, the electron beam controller 40 controls the accelerating potential controller so that an electron beam of the second energy E2 is emitted from the electron beam 22.

In the same manner as for the electron beam of the first energy E1, the measurements are made of the substrate current values for the electron beam having the second energy E2.

Figures 10, 11:
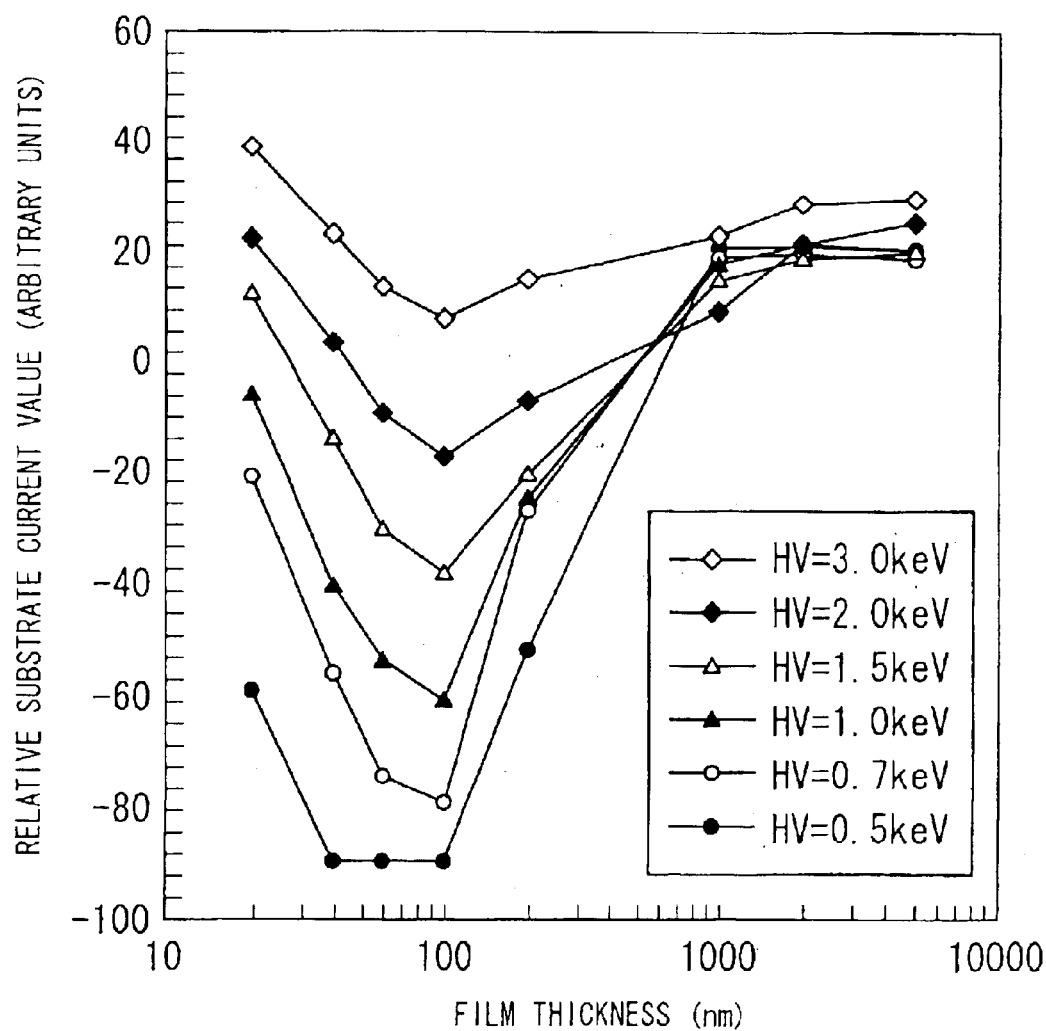
FIG. 10 is a drawing showing the measured data resulting from measurement of the substrate current by the film measuring apparatus, which is recorded into the measured data recording section.
FIG. 11 is a drawing showing a specific example of reference data stored in the reference data storage section.

FIG. 10 shows measured data recorded into the measured data recording section. The measured data recording section 56 records the first standard substrate current values Im (E1) for a first electron beam of the first energy E1 and the second standard substrate current values Im (E2) for a second electron beam of the second energy E2, in associative correspondence with the positions (x1,y1), (x1,y2), and (x1,y3) at which the electron beam is irradiated, respectively.

The calculation processor 58 calculates the differences between the first standard substrate current value Im (E1)

and the second standard substrate current value Im (E2) at one and the same positions of the irradiation by the electron beam.

As shown in FIG. 8, the measured data recording section 56 stores the difference [Im (E1)–Im (E2)] formed between the first standard substrate current values Im (E1) and the second standard substrate current values Im (E2), in associative correspondence with the positions of the irradiation by the electron beam.

The calculation processor 58 reads out the reference data from the reference data storage section 60 and compares the reference data with the measured data so as to calculate the thickness of the thin-film 34 at each position of the irradiation by the electron beam.

Figure 12:
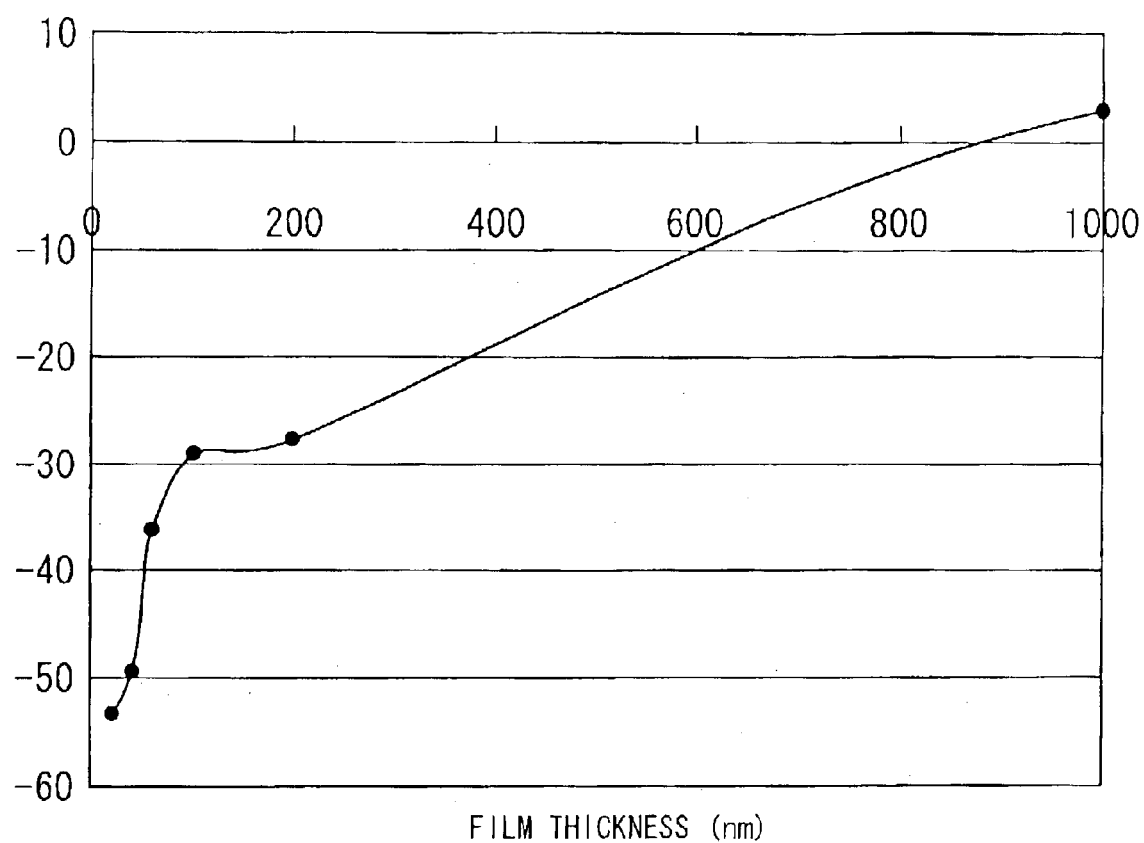
FIG. 12 is a drawing showing a specific example of reference data stored in the reference data storage section.

FIG. 9 shows an example of a table of standard substrate current values as reference and based upon this table, a function representing the relationship between the film thickness and the standard substrate current value, as shown in FIG. 12, can be obtained.

On the other hand, each one of the test substrate current values (measured values) obtained at each one of the positions at which the electron beam was irradiated, are stored in the measured current storage part 10 with a table such as shown in FIG. 10, and accordingly, the film thickness at each one of the position of the thin-film, at which the electron beam was irradiated, can be calculated by comparing the measured test substrate current value as stored in the measured current storage part 10 with the function representing the relationship between the film thickness and the standard substrate current value.

The above-noted sequence of operations is performed by the CPU 46 and a control program for control thereof, and the calculated results being indicated on the display 66.

The measured data recording section 56 can further store the calculated film thicknesses in association with the corresponding positional data representing a position at which the electron beam is irradiated.

FIG. 11 and FIG. 12 show specific examples of reference data stored in the reference data storage section 60.

FIG. 11 shows the correlation between the thickness of the film and the standard substrate current values obtained in the case in which a plurality of electron beams each having the respective energies of 0.5 keV, 0.7 keV, 1.0 keV, 1.5 keV, 2.0 keV, and 3.0 kev in accelerating potentials, are caused to be irradiated at a silicon oxide thin-film 34 formed on a silicon substrate 32, respectively.

As shown in the FIG. 11, when the thickness of the silicon oxide film is 10 nm or greater, there is no 1:1 relationship between the substrate current value and the film thickness.

In the case in which the thin-film 34 and substrate 32 are made of different materials than in the above-noted case, the film thickness is not restricted to the range of thickness of film indicated here and the film thickness measuring apparatus 18 being usable to measure the thickness of a thin-film when the thickness of the thin-film 34, in the reference data, falls into a range in which no 1:1 relationship in the reference data between the reference substrate current and the film thickness is established.

FIG. 12 shows the correlative relationship between the film thickness and difference between the substrate current value when an electron beam having an energy represented by an accelerating potential of 0.5 keV and an electron beam having an energy represented by an accelerating potential of 1.0 keV were irradiated at a standard sample.

As shown in this drawing, even when the thickness of the sample of film made of silicon oxide, exceeds 10 nm, the relationship between the film thickness and the difference of the substrate current values at the two difference electron beam energies, can show a 1:1 relationship therebetween.

For this reason, if the difference between the test substrate current values is determined, it is possible to uniquely calculate the film thickness by considering this reference data.

It will be understood that, although in FIG. 11 and FIG. 12 the graphs are of the reference data, it is also possible for the reference data storage section 60 to store these data as values.

Additionally, in the examples of FIG. 11 and FIG. 12 the reference data storage section 60 can store any reference data that indicates the correlation between the film thickness and a reference variable determined from the standard substrate current values at a plurality of energies.

In this case, the reference data storage section 60 can store a calculation equation to determine the variable in associative correspondence to each of the data.

Figure 13A:
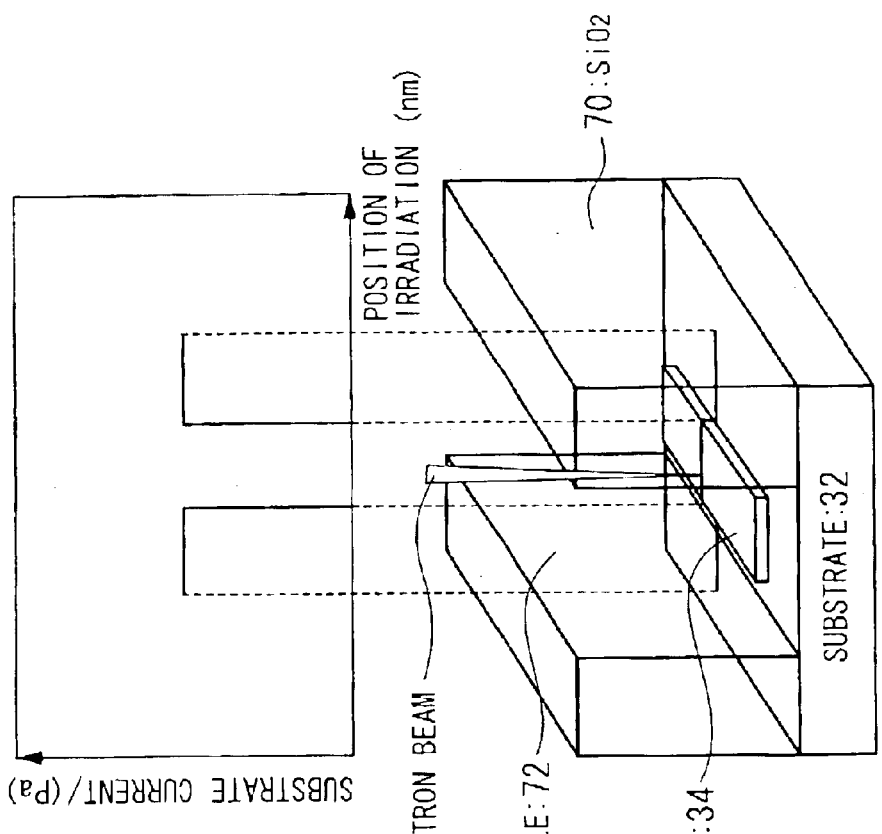
FIGS. 13(a) and 13(b) are drawings providing graphs showing the relationship between the position of incidence and the substrate current.
Figure 13B:
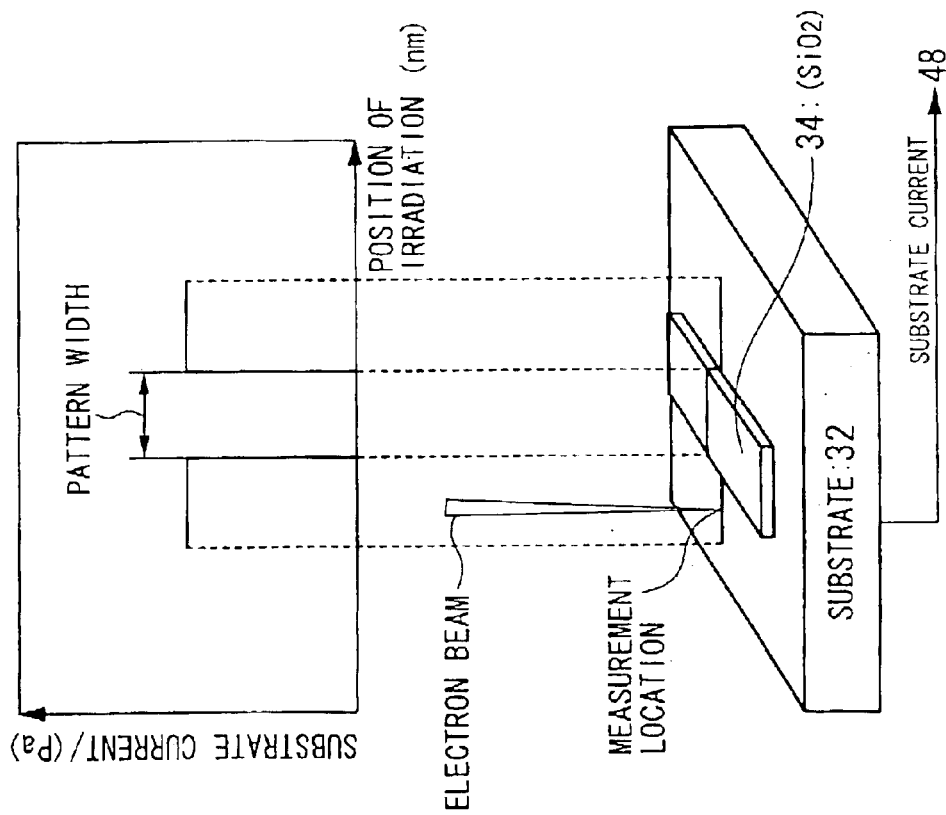

FIGS. 13(a) and 13(b) provides graphs showing the relationship between the position of the irradiation by the electron beam and the substrate current value.

FIG. 13(a) shows the relationship between the position of the irradiation and the substrate current value for the case in which a thin-film 34 made of silicon dioxide ($SiO_2$) is formed on a flat silicon substrate 32, wherein the wafer stage 26 is moved, for example, so that the electron beam is caused to be irradiated at the film 34, in a direction so that the electron beam crosses the thin-film 34, transversely.

In this case, a direction of the current caused by the electron beam is taken as a positive.

Although, because the current generated by the electron beam is dominant at locations at which the thin-film 34 is not formed on the substrate, the substrate current value takes on a positive value, while, since the compensation current becomes larger than the current caused by the electron beam at locations at which the thin-film 34 is formed, the substrate current value become negative and small at these positions.

As described above, by comparing the obtained measured data with the reference data, it is possible to calculate the thickness of the thin-film 34, but it is further possible to detect the width of a pattern of the thin-film 34.

According to the film thickness measuring apparatus 18 of this embodiment in the present invention, by measuring a plurality of the substrate current values flowing in the substrate 32 when an electron beams each having the respective energies being different from each other, are irradiated at the substrate 32, respectively, it is possible to uniquely determine the thickness of the thin-film 34, from these measured substrate current values taking the reference data into the account.

And thereby, enabling detection of the width of a pattern of the thin-film 34 with better accuracy.

FIG. 13(b) shows the relationship between the position of the irradiation and the substrate current value for the case of measuring a thin-film 34 made of silicon oxide and provided at the bottom part of a hole 72 formed in a silicon oxide film layer 70 deposited on a silicon substrate 32, wherein the electron beam is scanned over the thin-film 34 transversely.

When this is done, in order that the electron beam is directly irradiated at the thin-film 34 within the hole 72, it is preferable that the electron beam is irradiated at the thin film 34, perpendicularly.

The hole 72 preferably can have any aperture shape such that the electron beam can be irradiated at the thin-film 34.

When the electron beam strikes, secondary electrons are emitted from the thin-film 34 of a quantity commensurate with the film thickness thereof. The emitted secondary electrons can exit from to the outside of the hole 72, and there are also cases in which they are absorbed by the silicon oxide film layer 70 in which the hole 72 is formed.

By causing an electron beam to be irradiated at the thin-film 34 within the hole 72 perpendicularly, the amount of secondary electrons absorbed by the silicon oxide film layer 70 is reduced, enabling a more accurate calculation of the thickness of the thin-film 34.

If the direction of current flow occurring because of the electron beam is taken as positive, when an electron beam is caused to be irradiated at the silicon oxide film layer 70, because the film thickness of the silicon oxide film layer 70 is quite large, the compensation current is reduced, and the substrate current value increases in the positive direction.

At a position at which the thin-film 34 is formed, however, the compensation current is larger than the current caused by the electron beam, so that the substrate current value takes on a negative polarity and is small.

As described above, by comparing these obtained measured data with the reference data, it is not only possible to calculate the thickness of the thin-film 34, but also to detect the shape of the hole 72.

One specific example of the hole 72 is a contact hole remaining after etching is completed. For a contact hole with a large aspect ratio, there are cases in which the sizes of the aperture part and the bottom part differs, and it is particularly important to know the size of the base part of the contact hole at which the silicon substrate is exposed.

Using the method for measuring the thickness of a thin-film according to this embodiment, it is possible to measure the shape of the bottom part of the contact hole, or to determine the width, surface area or shape of the remaining silicon substrate at the bottom part.

In contrast to the first embodiment described above, in which the calculation processor 58 performs such calculation as the calculation of the difference in a plurality of substrate current values by causing electron beams of a plurality of energies to be irradiated at a thin-film, and calculates the thickness of the thin-film by comparing the calculated results with reference data, it is alternatively possible, as a second embodiment of the present invention, for the calculation processor 58 to extract candidates for film thickness of the thin-film to be measured based on a first test substrate current value measured by causing a first electron beam of a first energy to be irradiated at the thin-film to be measured, and then to select the film thickness from the candidates based on a second test substrate current value measured by causing a second electron beam of a second energy to be irradiated at the thin-film to be measured.

Figure 14:
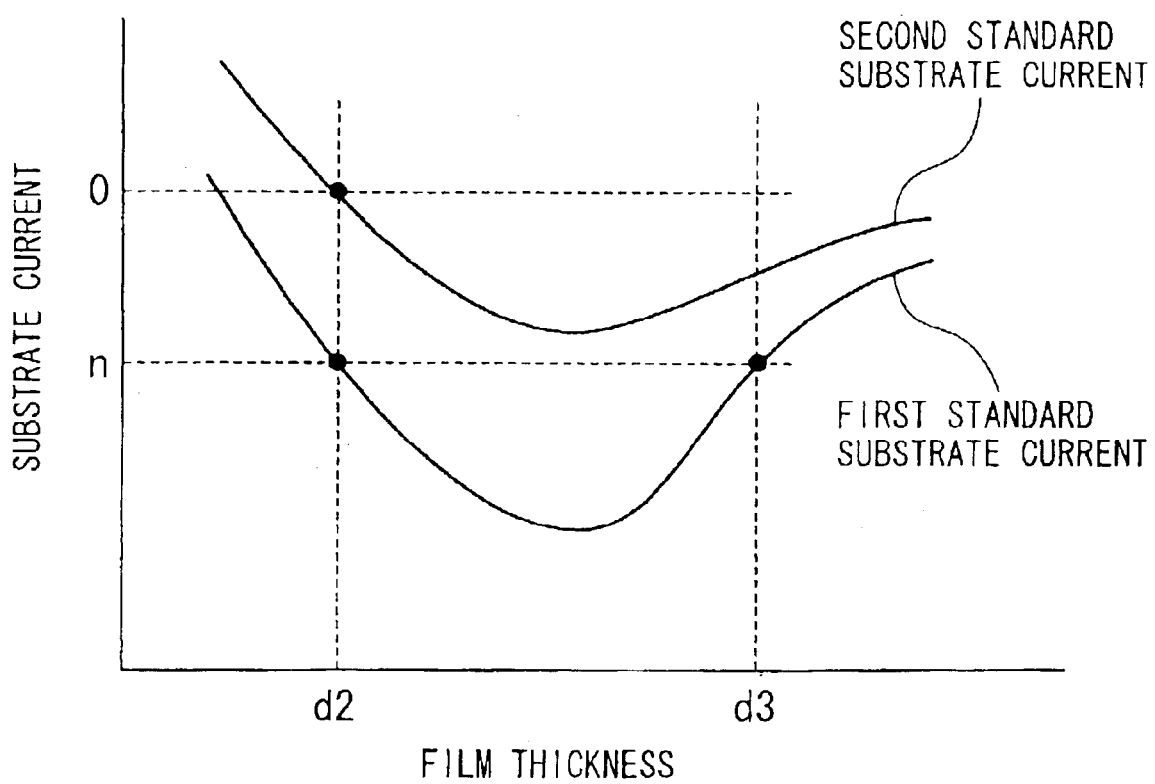
FIG. 14 is a graph showing an example of reference data stored in the reference data storage section.

FIG. 14 is a schematic representation showing an example of reference data stored in the reference data storage section 60.

This drawing shows the correlation between the first and second standard substrate current values, used for the reference data and occurring when a first and second electron beams of the first and second energies E1 and E2 are irradiated at the standard sample of film, respectively, and the film thickness.

The thin-film measuring apparatus 18 measures the first test substrate current value Im (E1) when a first electron beam having the first energy is irradiated at the sample of film 34 to be measured.

If as a result Im (E1)=n, the calculation processor 58 extracts d2 and d3 as candidates based on the graph as shown in FIG. 14, for the possible film thickness of the thin-film 34.

Next, the thin-film measuring apparatus 18 measures the second test substrate current value Im (E2) when a second electron beam having the second energy is irradiated at the same sample of film 34.

If the result of the measurement is Im (E2)=o, the calculation processor 58 identifies the thickness of the thin-film 34 as d2.

As mentioned above, the present invention has been explained with reference to several embodiments used in this invention.

However, these embodiments as mentioned above are examples of this invention and it is acknowledged that there are many numbers of variations of the present invention by changing combination in each one of the constituent elements or each one of the processing processes or the like and it is understood by a person skilled in this art that these variations can be included in the basic technical conception of this invention.

The following embodiments will be the case as mentioned above.

The above is a description of embodiments of the present invention, which are described for the case in which the thin-film measuring apparatus 18 varies the energy of an electron beam that is caused to strike the thin-film by varying the accelerating potential thereof.

It will be noted that when the accelerating potential of an electron beam is varied, the deflection of the electron beam changes even if the deflection signal to the deflection section 24 remains the same.

For this reason, the point of incidence controller 46 can output to the measured data recording section 56 point of incidence data that takes into consideration the deflection error caused at the deflection section in response to the accelerating potential. By doing this, it is possible to maintain a constant position of incidence even if measurement is performed while varying the accelerating potential.

Another embodiment of the present invention is related to a computer program and it is characterized in that a computer program for causing a computer to execute a process for measuring the thickness of a film to be measured and which is formed on a substrate using a substrate current value of a current flowing in the substrate when an electron beam is irradiated on the film to be measured caused to strike the thin-film to be measured that is formed on the substrate, the process comprising:

processing for obtaining reference data indicating a relationship between a reference function having, as variables, a first standard substrate current value for the case in which a first electron beam having a first energy, is radiated at a standard sample of a film and a second standard substrate current value for a case in which a second electron beam having a second energy different from the first energy, is irradiated at the standard sample of film, and a film thickness of the standard sample of film;

processing for obtaining a first test substrate current value of a current flowing in the substrate when the first electron beam is irradiated at the film to be measured which is formed on the substrate;

processing for obtaining a second test substrate current value of a current flowing in the substrate when the second electron beam is irradiated at the film to be measured which is formed on the substrate; and processing for calculating a film thickness of the film to be measured, based on the first test substrate current value and the second test substrate current value, taking the reference data into the account.

Further separate embodiment of the present invention is a computer program which includes an improvement of the above-mentioned computer program and it is characterized in that a computer program as mentioned above, wherein in the processing for obtaining the reference data, the reference function is held in a form of f (a,b) (where a and b indicate, respectively, the standard substrate currents for the cases in which the first and second electron beams are irradiated at the standard sample, respectively), and the relationship of a thickness d of the standard sample of film and the reference function f(a,b) is held in the form d=Γ[f(a, b)] and wherein;

in the processing for calculating the film thickness, by substituting the first test substrate current value for a and the second test substrate current value for b of the equation d=Γ[f(a, b)], respectively, the film thickness d of the film under measurement is calculated.

According to an apparatus or method for measuring the thickness of a thin-film constituted as described in detail above, it is possible to measure with good accuracy the thickness of a thin-film formed on a substrate over a wide range of film thicknesses.

What is claimed is:

1. A system to measure a thickness of a film, which is disposed on or above a semiconductor wafer, the system comprising:
    an electron gun to irradiate an electron beam on the film, wherein the electron beam includes a first acceleration voltage and a second acceleration voltage;
    an electrode, coupled to the semiconductor wafer, to detect a first substrate current in the wafer and a second substrate current in the wafer, wherein:
        the first substrate current is generated in response to the electron beam, having a first acceleration voltage, irradiated on the film; and
        the second substrate current is generated in response to the electron beam, having a second acceleration voltage, irradiated on the film; and
    a processor, coupled to the electrode, to determine the thickness of the film using the first substrate current, the second substrate current and reference data, wherein the reference data is data which provides a correlation between a substrate current and a thickness of a film.

2. The system of claim 1 further including an electron beam controller, coupled to the electron gun, to control the acceleration of the electron beam output by the electron gun.

3. The system of claim 2 further including a current measuring section, coupled to the electrode, to measure the first and second substrate currents detected by the electrode.

4. The system of claim 3 further including a data recording unit, coupled to the processor, to store data which is representative of:
    a spatial location on the film that is irradiated by the electron beam;
    an acceleration voltage of the electron beam; and
    a substrate current measured for the associated spatial location on the film and the associated voltage of the electron beam.

5. The system of claim 1 wherein the reference data is data which provides a correlation between a substrate current and a thickness of a test or sample film, which is disposed on or above a semiconductor wafer.

6. The system of claim 1 wherein the reference data is representative of a substrate current determined via a theoretical calculation.

7. The system of claim 1 further including:
    a deflection section to controllably deflecting the electron beam;
    a deflection controller, coupled to the deflection section, to control the deflection section;
    a wafer stage, coupled to the electrode, to support the electrode;
    a wafer stage drive, coupled to the wafer stage, to move the wafer stage to a prescribed position;
    a wafer stage controller, coupled to a wafer stage drive, to control the wafer stage drive; and
    an irradiation position controller, coupled to the deflection controller and the wafer stage controller, to control the location of the electron beam and the wafer stage, such that the electron beam irradiates a prescribed portion of the film.

8. The system of claim 7 wherein the irradiation position controller controls the deflection controller and the wafer stage controller such that the electron beam is scanned over the prescribed portion of the film.

9. The system of claim 1 wherein the electron gun irradiates the electron beam on the film at a constant angle, relative to the surface of the film, over the prescribed portion of the film.

10. The system of claim 1 wherein the film is an insulator.

11. The system of claim 1 wherein the electron gun irradiates the electron beam on the film at an angle that is perpendicular to the surface of the film.

12. The system of claim 1 further including:
    a wafer stage, coupled to the electrode, to support the electrode, wherein the wafer stage is capable of supporting the wafer;
    a wafer stage drive, coupled to the wafer stage, to move the wafer stage to a prescribed position; and
    a wafer stage controller, coupled to a wafer stage drive, to control the wafer stage drive and thereby move the wafer, relative to the electron beam, such that the electron beam is scanned over a prescribed portion of the film.

13. The system of claim 1 further including a wafer stage which is capable of moving the wafer in at least one direction relative to the electron beam, and wherein the wafer stage moves the wafer relative to the electron beam while the electron gun irradiates the electron beam on the wafer.

14. A method to measure a thickness of a film disposed on or above a semiconductor wafer, the method comprising:
    irradiating the film with an electron beam having a first acceleration voltage;
    measuring a first substrate current at a back surface of the semiconductor wafer wherein the first substrate current is generated in response to the irradiating the film with the electron beam having the first acceleration voltage;
    irradiating the film with an electron beam having a second acceleration voltage;
    measuring a second substrate current at a back surface of the semiconductor wafer wherein the second substrate current is generated in response to the irradiating the film with the electron beam having the second acceleration voltage;
    determining the thickness of the film using the first substrate current, the second substrate current and reference data, wherein the reference data is data which provides a correlation between a substrate current and a thickness of a film.

15. The method of claim 14 wherein:
irradiating the film with the electron beam having the first acceleration voltage further includes scanning the electron beam having the first acceleration voltage across at least a prescribed portion of the film; and
irradiating the film with the electron beam having the second acceleration voltage further includes scanning the electron beam having the second acceleration voltage across at least the prescribed portion of the film.

16. The method of claim 15 wherein scanning the electron beam having the first acceleration voltage across at least the prescribed portion of the film includes moving the semiconductor wafer relative to the electron beam.

17. The method of claim 14 wherein:
irradiating the film with the electron beam having the first acceleration voltage includes irradiating the film with the electron beam at a constant beam angle relative to the surface of the film; and
irradiating the film with the electron beam having the second acceleration voltage includes irradiating the film with the electron beam at a constant beam angle relative to the surface of the film.

18. The method of claim 14 further including displaying information which is representative of the amount of substrate current measured in response to the electron beams irradiated on the film.

19. The method of claim 14 further including storing data which is representative of:
a spatial location on the film that is irradiated by the electron beam;
an acceleration voltage of the electron beam; and
a substrate current measured for the associated spatial location on the film and the associated voltage of the electron beam.

20. The method of claim 14 wherein the reference data is data which provides a correlation between a substrate current and a thickness of a test or sample film, which is disposed on or above a semiconductor wafer.

21. The method of claim 14 wherein the reference data is representative of a substrate current determined via a theoretical calculation.

22. A system to measure a thickness of a thin film, which is disposed on or above a semiconductor wafer, the system comprising:
an electron gun to irradiate an electron beam on the film, wherein the electron beam includes a first acceleration voltage and a second acceleration voltage;
an electrode, capable of receiving the semiconductor wafer, to detect substrate current in the wafer, wherein:
a first substrate current is generated in response to the electron beam, having a first acceleration voltage, irradiated on the film; and
a second substrate current is generated in response to the electron beam, having a second acceleration voltage, irradiated on the film; and
a wafer stage, wherein the wafer stage is coupled to the electrode;
an irradiation position controller, coupled to the wafer stage, to control the position of the wafer stage relative to the electron beam such that the electron beam irradiates a prescribed portion of the film in a scanning manner; and
a processor, coupled to the electrode, to determine the thickness of the thin film using the first and second substrate currents and reference data, wherein the reference data is data which provides a correlation between a substrate current and a thickness of a film.

23. The system of claim 22 further including an electron beam controller, coupled to the electron gun, to control the acceleration of the electron beam output by the electron gun.

24. The system of claim 23 further including a current measuring section, coupled to the electrode, to measure the first and second substrate currents detected by the electrode.

25. The system of claim 22 wherein the reference data is data which provides a correlation between a substrate current and a thickness of a test or sample film, which is disposed on or above a semiconductor wafer.

26. The system of claim 22 wherein the reference data is representative of a substrate current determined via a theoretical calculation.

27. The system of claim 22 further including a data recording unit, coupled to the processor, to store data which is representative of:
a spatial location on the film that is irradiated by the electron beam;
an acceleration voltage of the electron beam; and
a substrate current measured for the associated spatial location on the film and the associated voltage of the electron beam.

28. The system of claim 22 further including:
a deflection section to controllably deflecting the electron beam;
a deflection controller, coupled to the deflection section, to control the deflection section;
a wafer stage drive, coupled to the wafer stage, to move the wafer stage to a prescribed position;
a wafer stage controller, coupled to a wafer stage drive, to control the wafer stage drive; and
wherein the irradiation position controller is coupled to the deflection controller and the wafer stage controller to control the location of the electron beam and the wafer stage, such that the electron beam irradiates the prescribed portion of the film.

29. The system of claim 22 wherein the electron gun irradiates the electron beam on the film at a constant angle, relative to the surface of the film, over the prescribed portion of the film.

30. The system of claim 22 wherein the film is an insulator.

31. The system of claim 22 wherein the electron gun irradiates the electron beam on the film at an angle that is perpendicular to the surface of the film.

32. The system of claim 22 further including:
a wafer stage drive, coupled to the wafer stage, to move the wafer stage to a prescribed position; and
a wafer stage controller, coupled to a wafer stage drive, to control the wafer stage drive and thereby move the wafer, relative to the electron beam, such that the electron beam is scanned over a prescribed portion of the film.

* * * * *

UNITED STATES PATENT AND TRADEMARK OFFICE
CERTIFICATE OF CORRECTION

PATENT NO.    : 6,850,079 B2
DATED         : February 1, 2005
INVENTOR(S)   : Yamada et al.

It is certified that error appears in the above-identified patent and that said Letters Patent is hereby corrected as shown below:

Column 22,
Line 2, delete "deflecting" and substitute -- deflect --.
Line 24, delete "over the" and substitute -- over a --.

Column 24,
Line 29, delete "deflecting" and substitute -- deflect --.

Signed and Sealed this

Third Day of May, 2005

JON W. DUDAS
*Director of the United States Patent and Trademark Office*